June 6, 1950 G. E. SOPER 2,510,528
METHOD OF MAKING SPIRAL BEVEL GEARS AND HYPOID GEARS
Filed Dec. 10, 1947 23 Sheets-Sheet 1

INVENTOR.
Guy E. Soper
BY
Hoguet, Neary & Campbell
ATTORNEYS.

June 6, 1950 G. E. SOPER 2,510,528
METHOD OF MAKING SPIRAL BEVEL GEARS AND HYPOID GEARS
Filed Dec. 10, 1947 23 Sheets-Sheet 2

INVENTOR.
Guy E. Soper
BY
Hoguet, Neary & Campbell,
ATTORNEYS.

June 6, 1950  G. E. SOPER  2,510,528
METHOD OF MAKING SPIRAL BEVEL GEARS AND HYPOID GEARS
Filed Dec. 10, 1947  23 Sheets-Sheet 5

$d\phi$ = CUTTER TILT ANGLE

INVENTOR.
GUY E. SOPER
BY
Hoguet, Neary & Campbell,
ATTORNEYS.

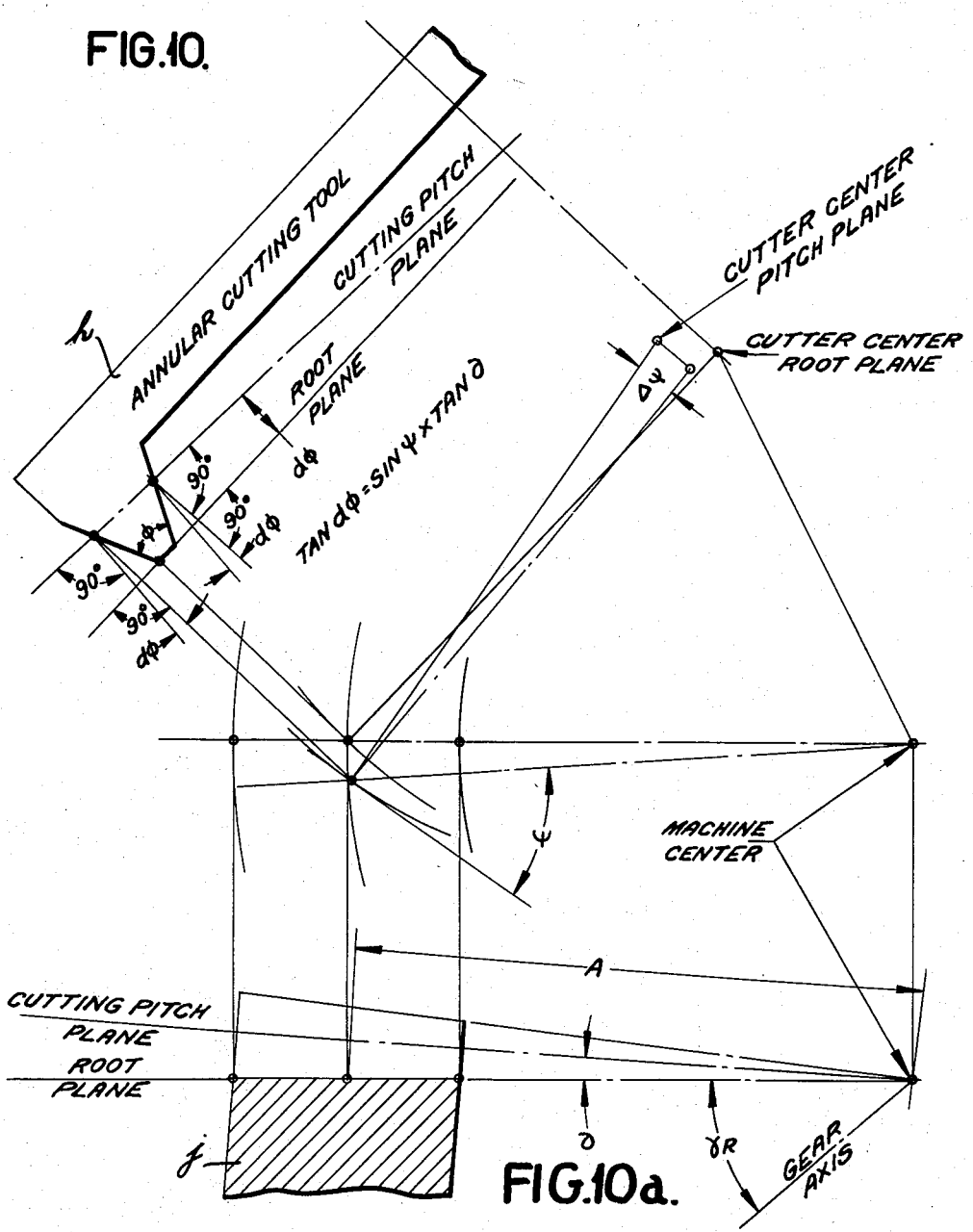

June 6, 1950 G. E. SOPER 2,510,528
METHOD OF MAKING SPIRAL BEVEL GEARS AND HYPOID GEARS
Filed Dec. 10, 1947 23 Sheets-Sheet 7
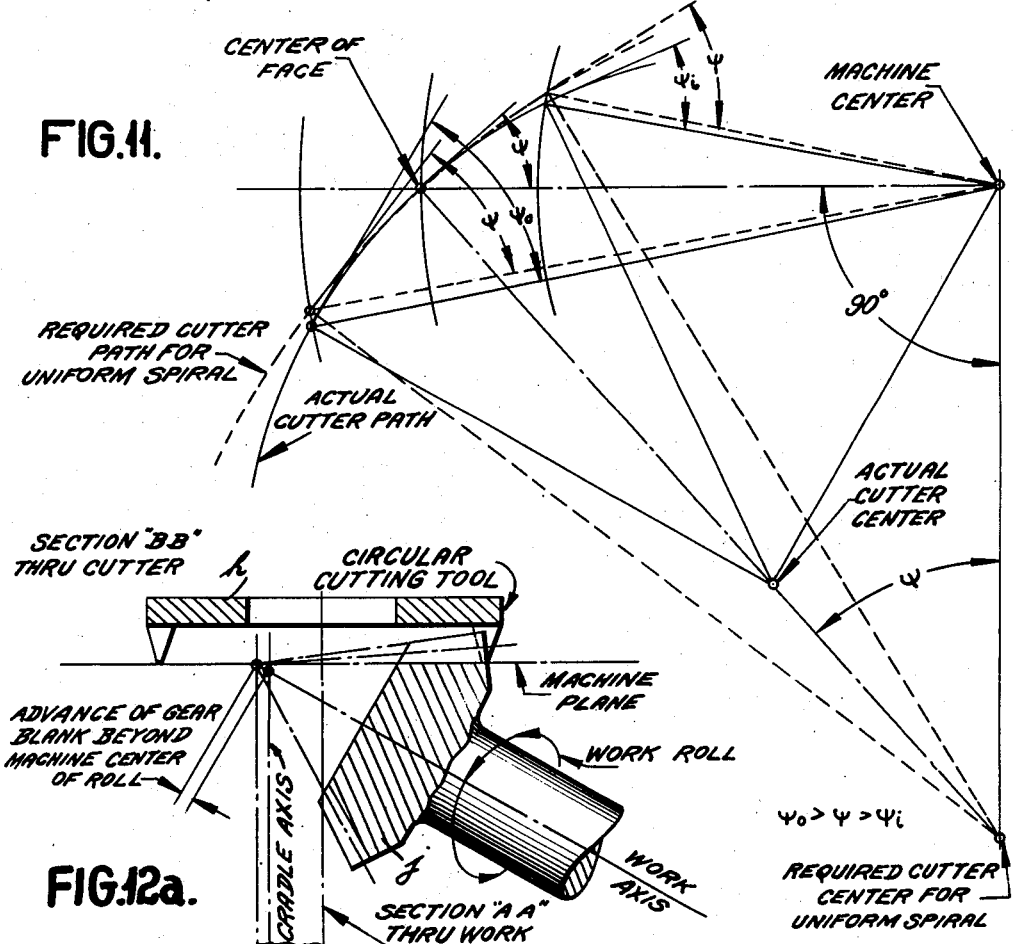
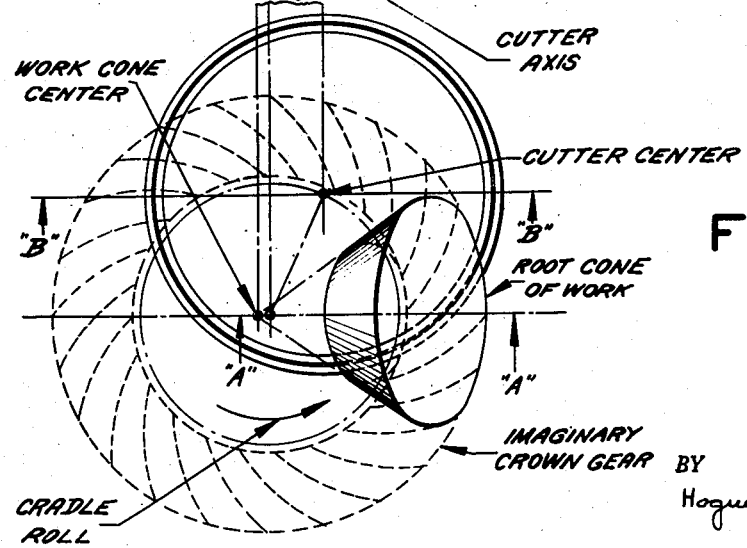
INVENTOR.
Guy E. Soper
BY
Hoguet, Neary & Campbell,
ATTORNEYS.

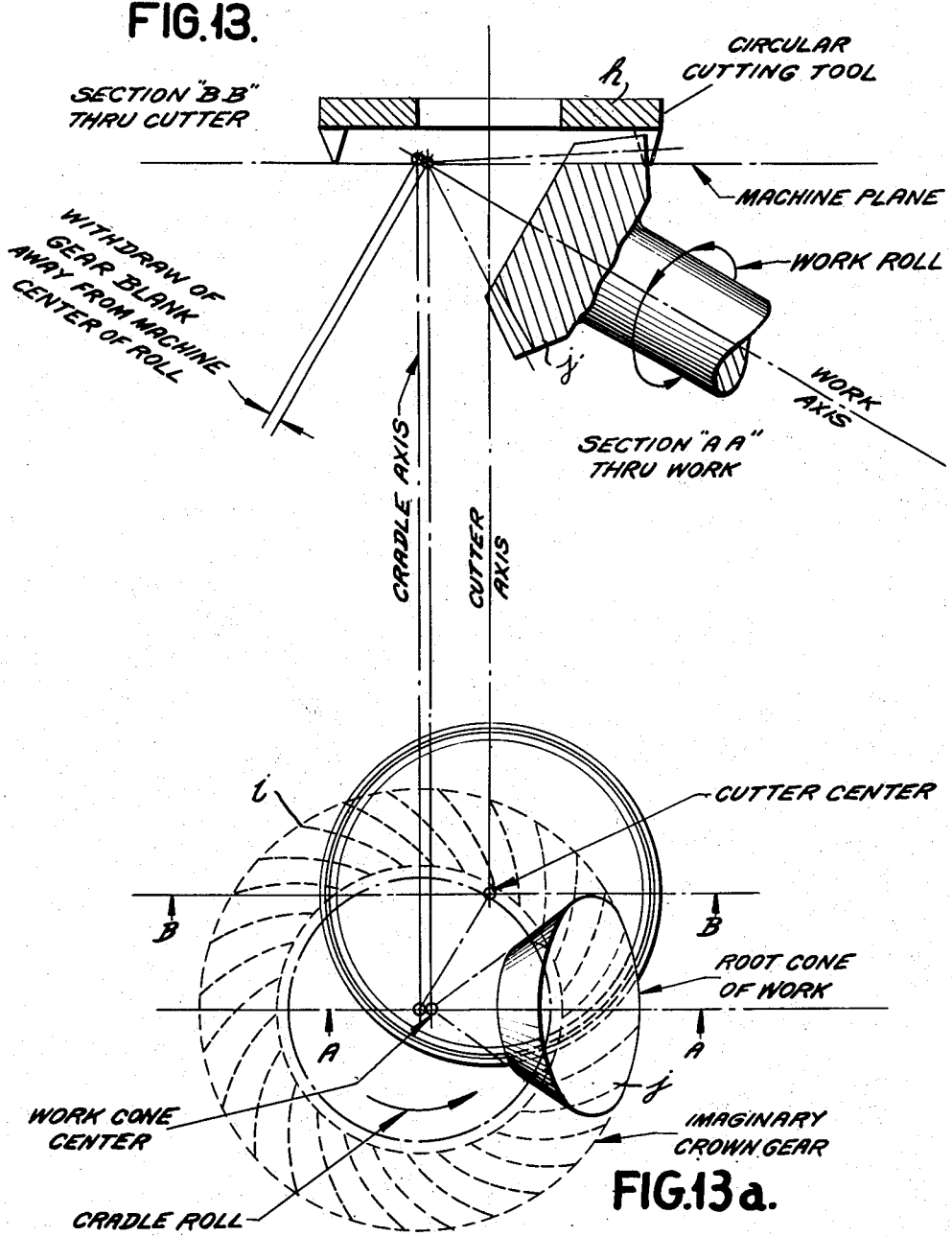

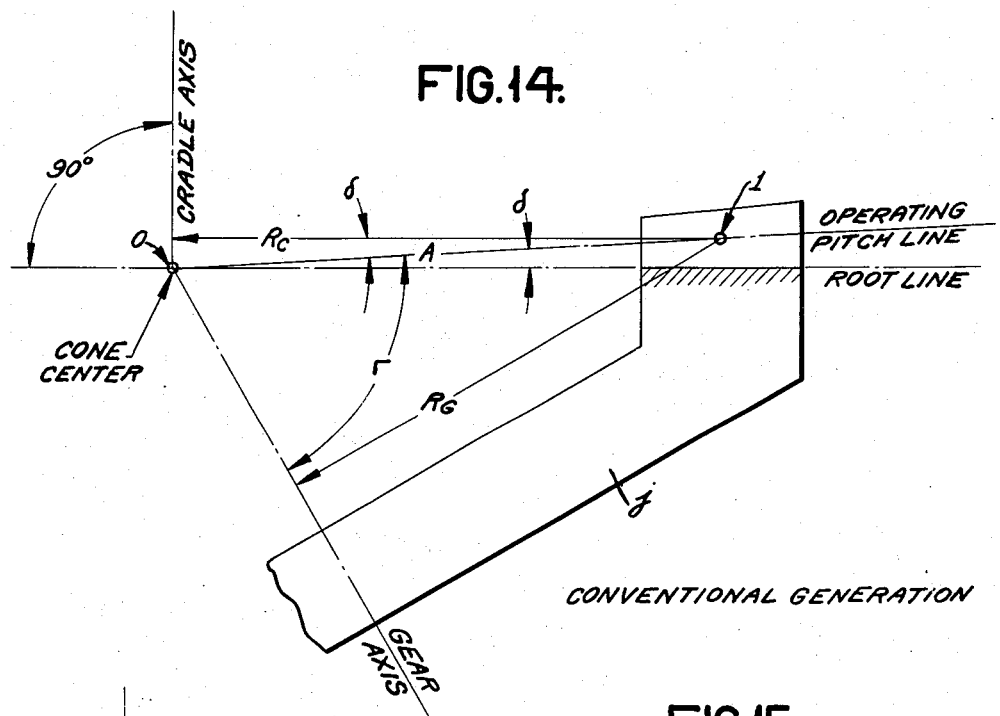
CONVENTIONAL GENERATION
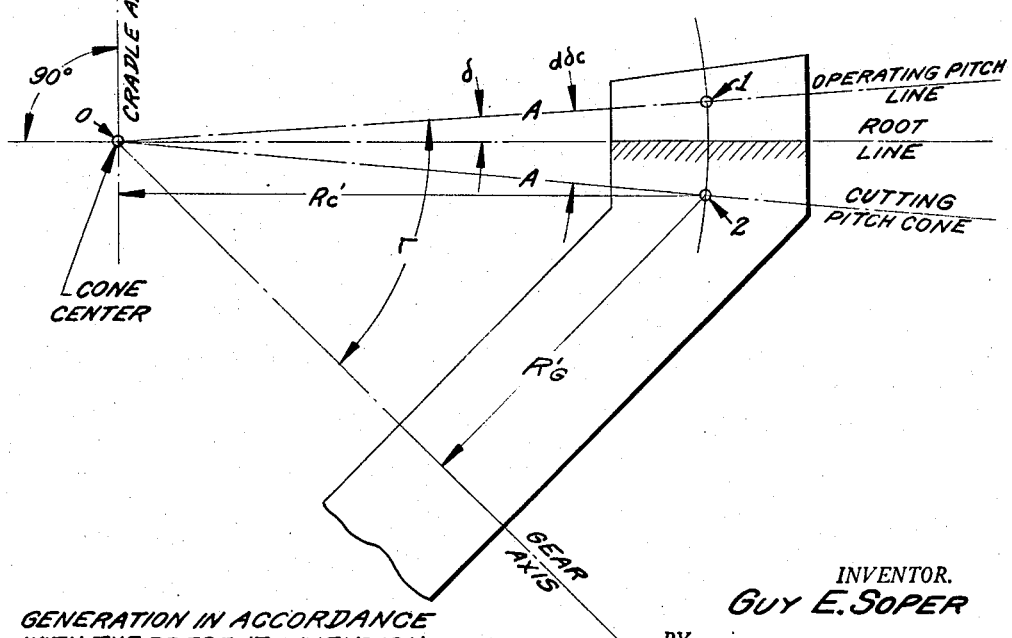
GENERATION IN ACCORDANCE WITH THE PRESENT INVENTION June 6, 1950  G. E. SOPER  2,510,528
METHOD OF MAKING SPIRAL BEVEL GEARS AND HYPOID GEARS
Filed Dec. 10, 1947  23 Sheets-Sheet 10

FIG.16.

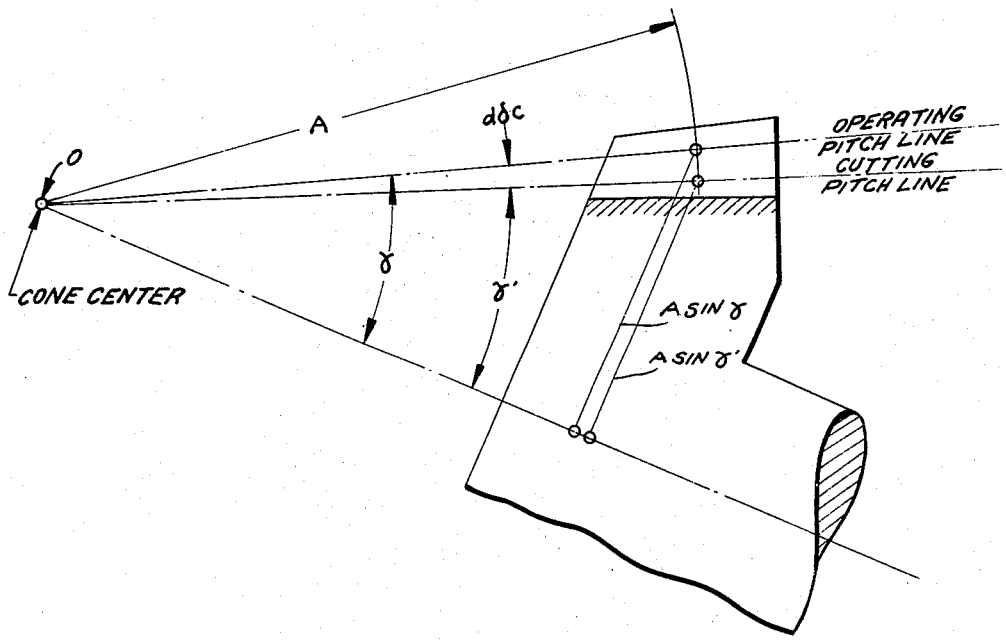

FIG.17.

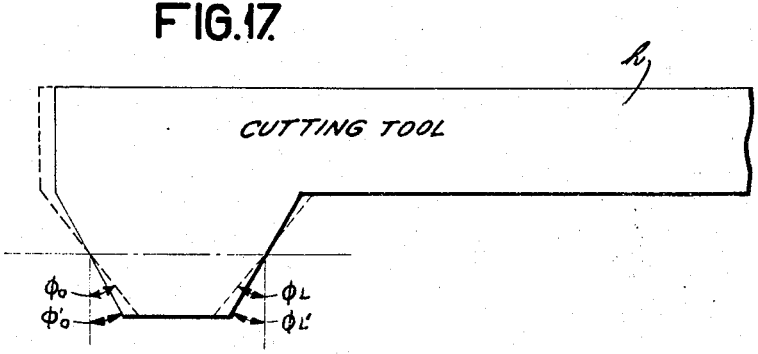

$\phi_o$ = CONVENTIONAL OUTSIDE BLADE ANGLE
$\phi'_o$ = ACTUAL OUTSIDE BLADE ANGLE
$\phi_L$ = CONVENTIONAL INSIDE BLADE ANGLE
$\phi'_L$ = ACTUAL INSIDE BLADE ANGLE
$\Delta\phi_o = \phi_o - \phi'_o$ = MISMATCH FOR OUTSIDE BLADE ANGLE
$\Delta\phi_L = \phi_L - \phi'_L$ = MISMATCH FOR INSIDE BLADE ANGLE INVENTOR.
Guy E. Soper
BY
Hoguet, Neary & Campbell,
ATTORNEYS.

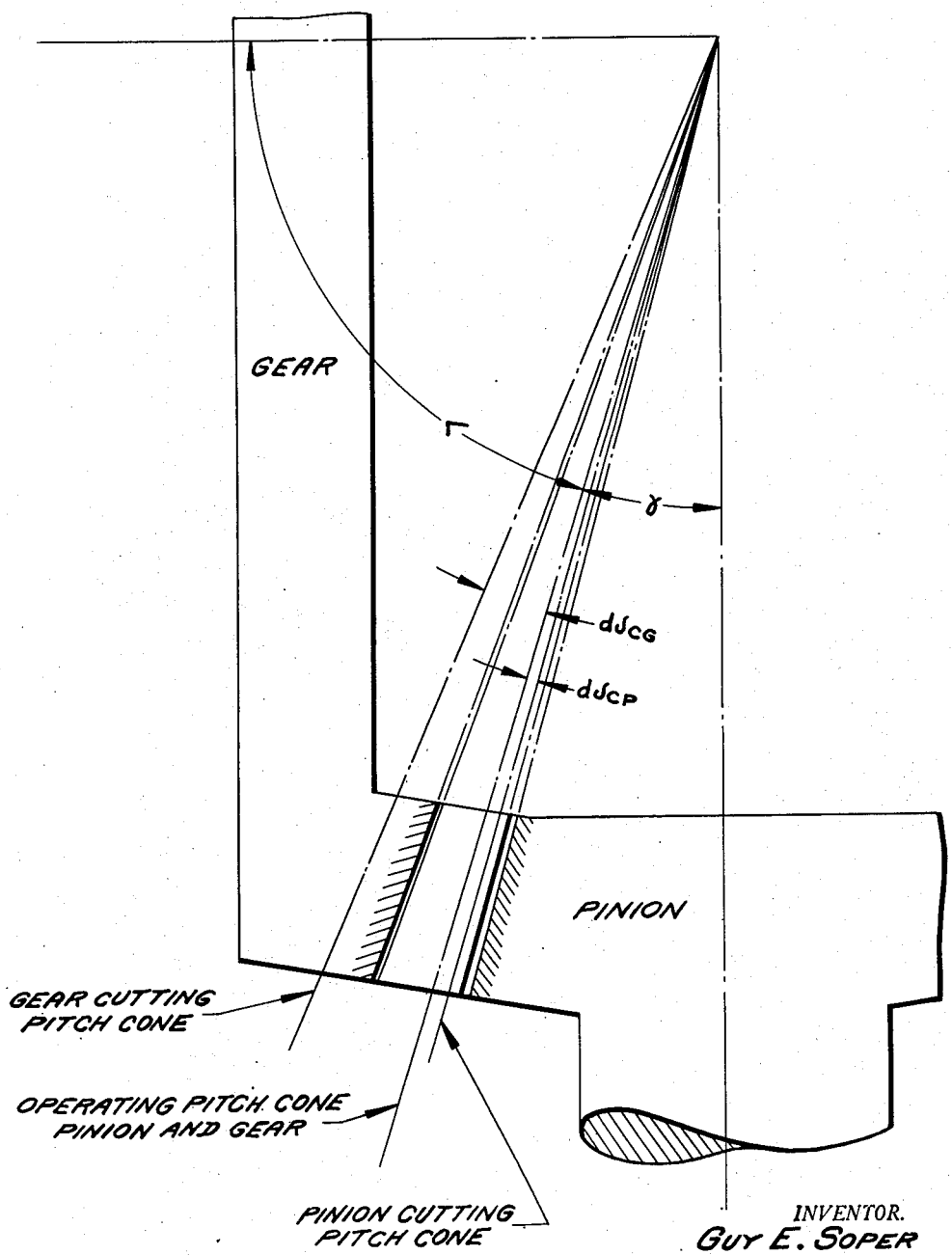

June 6, 1950 G. E. SOPER 2,510,528
METHOD OF MAKING SPIRAL BEVEL GEARS AND HYPOID GEARS
Filed Dec. 10, 1947 23 Sheets-Sheet 12

INVENTOR.
Guy E. Soper
BY
Hoguet, Neary & Campbell,
ATTORNEYS.

June 6, 1950  G. E. SOPER  2,510,528
METHOD OF MAKING SPIRAL BEVEL GEARS AND HYPOID GEARS
Filed Dec. 10, 1947  23 Sheets-Sheet 13

INVENTOR.
Guy E. Soper
BY
Hoguet, Neary & Campbell,
ATTORNEYS.

June 6, 1950 G. E. SOPER 2,510,528
METHOD OF MAKING SPIRAL BEVEL GEARS AND HYPOID GEARS
Filed Dec. 10, 1947 23 Sheets-Sheet 14

INVENTOR.
GUY E. SOPER
BY
Hoguet, Neary & Campbell,
ATTORNEYS.

June 6, 1950  G. E. SOPER  2,510,528
METHOD OF MAKING SPIRAL BEVEL GEARS AND HYPOID GEARS
Filed Dec. 10, 1947   23 Sheets-Sheet 15
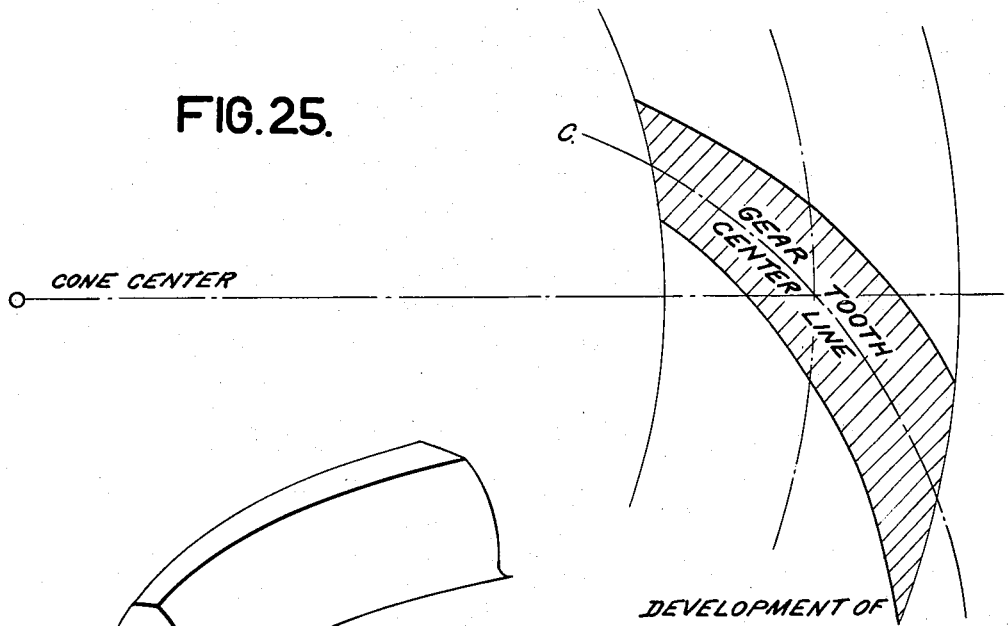
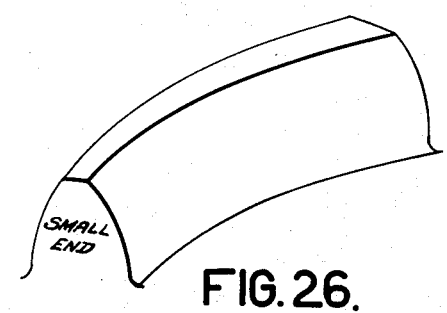
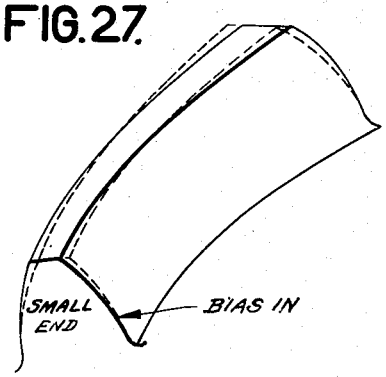
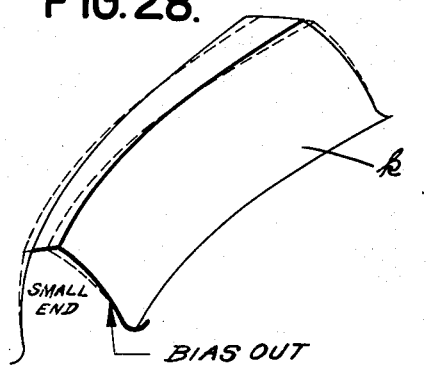
INVENTOR.
GUY E. SOPER
BY
Hoguet, Neary & Campbell,
ATTORNEYS.

June 6, 1950            G. E. SOPER            2,510,528
METHOD OF MAKING SPIRAL BEVEL GEARS AND HYPOID GEARS
Filed Dec. 10, 1947            23 Sheets—Sheet 16
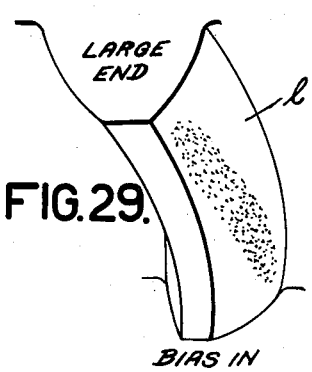
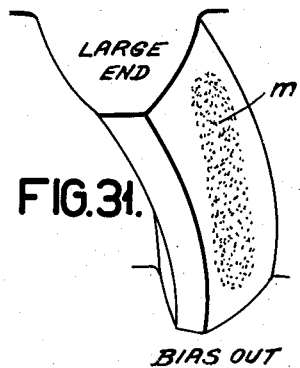
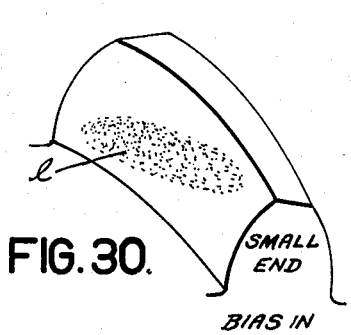
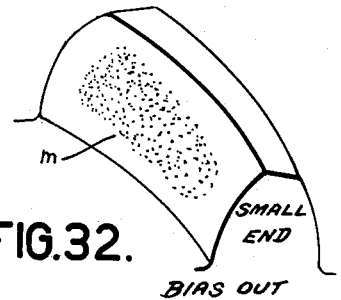
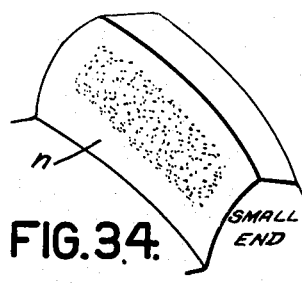
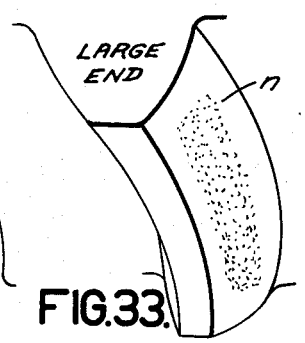
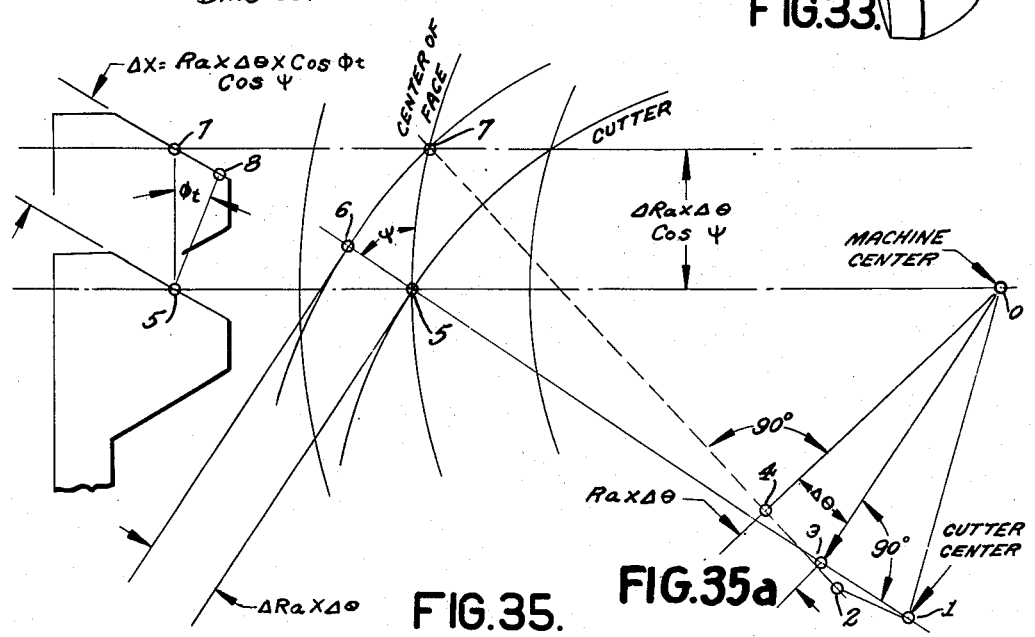
INVENTOR.
GUY E. SOPER
BY
Hoguet, Neary & Campbell,
ATTORNEYS.

June 6, 1950          G. E. SOPER          2,510,528
METHOD OF MAKING SPIRAL BEVEL GEARS AND HYPOID GEARS
Filed Dec. 10, 1947          23 Sheets—Sheet 17

INVENTOR.
Guy E. Soper
BY
Hoguet, Neary & Campbell,
ATTORNEYS.

June 6, 1950     G. E. SOPER     2,510,528
METHOD OF MAKING SPIRAL BEVEL GEARS AND HYPOID GEARS
Filed Dec. 10, 1947     23 Sheets-Sheet 19

INVENTOR.
GUY E. SOPER
BY
Hoguet, Neary & Campbell,
ATTORNEYS

June 6, 1950  G. E. SOPER  2,510,528
METHOD OF MAKING SPIRAL BEVEL GEARS AND HYPOID GEARS
Filed Dec. 10, 1947  23 Sheets-Sheet 20

INVENTOR.
GUY E. SOPER
BY Campbell, Brumbaugh & Free
HIS ATTORNEYS.

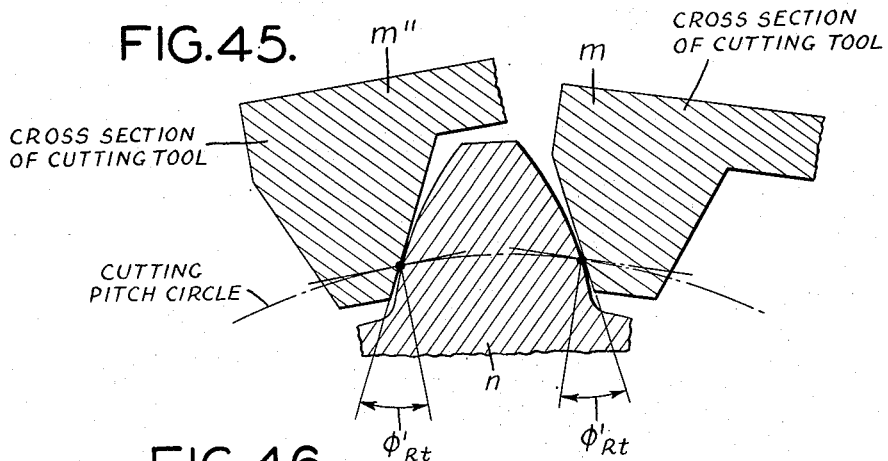
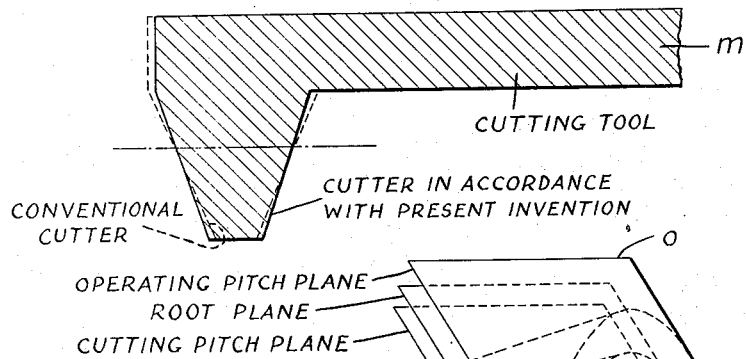
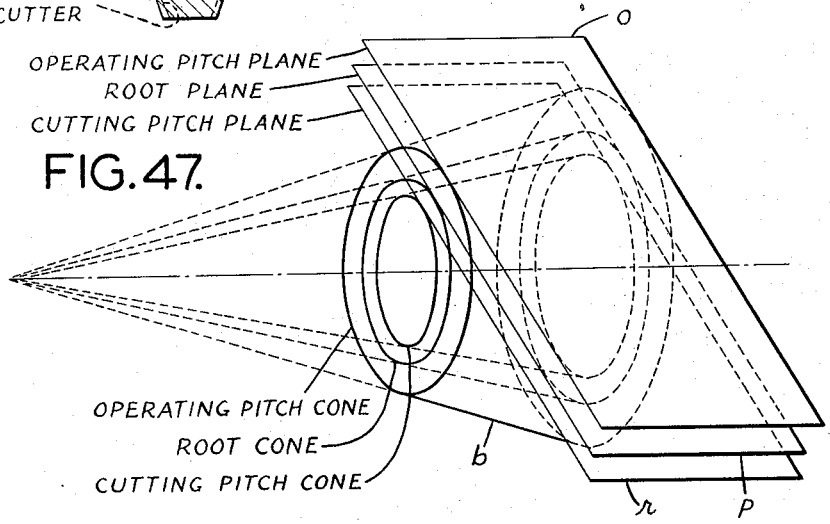

June 6, 1950   G. E. SOPER   2,510,528
METHOD OF MAKING SPIRAL BEVEL GEARS AND HYPOID GEARS
Filed Dec. 10, 1947   23 Sheets-Sheet 22

INVENTOR.
GUY E. SOPER
BY Campbell Brumbaugh & Free
HIS ATTORNEYS.

June 6, 1950  G. E. SOPER  2,510,528
METHOD OF MAKING SPIRAL BEVEL GEARS AND HYPOID GEARS
Filed Dec. 10, 1947  23 Sheets-Sheet 23

INVENTOR.
GUY E. SOPER
BY
Campbell Brumbaugh + Free
HIS ATTORNEYS.

Patented June 6, 1950

UNITED STATES PATENT OFFICE 2,510,528

METHOD OF MAKING SPIRAL BEVEL GEARS AND HYPOID GEARS

Guy E. Soper, New Brunswick, N. J., assignor to Mack Manufacturing Corporation, New York, N. Y., a corporation of Delaware Application December 10, 1947, Serial No. 790,859

14 Claims. (Cl. 90—5)

The present invention relates to methods of generating or cutting the teeth of spiral bevel gears and hypoid gears and embodies, more specifically, an improved method by means of which errors that have been inherent in present methods of manufacturing such gears are more effectively controlled than has been possible heretofore.

This is a continuation-in-part of application Serial No. 484,205, filed April 23, 1943.

Due to certain relationships between the cutting tool and the work spindle in which the gear blank is held during the cutting operation, the teeth of conventionally cut spiral bevel gears and hypoid gears have had a formation in which inherent errors occur, as will be presently described, and these errors have had to be corrected by machining operations which are generally termed "shop development operations."

Because of the fact that a circular cutter is used in the cutting operation, and because this cutter must be tilted to the root line of the teeth being cut, the blade angle of the cutting tool must be different from the normal pressure angle of the gear tooth. If this difference in angular relationship remained constant, the difficulty would be easily overcome, but, unfortunately, this difference in angular relationship changes throughout the length of the gear tooth. A practical limitation on the cutter diameter causes the spiral angle to change its value along the length of the tooth, causing a corresponding change in the difference between the cutting blade angle and the normal pressure angle of the tooth.

As will be presently described, the difference in the blade angle of the cutting tool and the pressure angle of the gear tooth produces a mismatch of the mating gear teeth and, where the difference in the angular relationship varies, a variation in the rate of mismatch occurs which produces objectionable characteristics in the operation of the gears.

The magnitude of the changing difference in the angular relationship above described, and correspondingly in the rate of mismatch, is determined by the magnitude of the angle between the root planes of the mating gears and the inherent error existing in a conventionally cut spiral bevel gear, or hypoid gear is termed the error of "bias in."

In the conventional method of cutting spiral bevel gear teeth, the movement of the cutting tool in the generating action, is timed, or agreed with, the peripheral speed, at the center of the gear face, of a cutting pitch cone whose cone angle equals the cone angle of the respective operating pitch cone. Attempts have heretofore been made to correct or reduce the inherent error above referred to by suitably displacing or positioning the apices of the cutting and operating pitch cones. This operation has proved to be an unsatisfactory expedient in the manufacture of gears of this type and has given rise to shop development procedures that are difficult and generally unsatisfactory.

Essentially, the prior operations have consisted of generating a gear which has a "bias in" error, and then attempting to compensate for this error by generating a mating gear which has another error, usually a "bias out" error to cause the gears to mesh. With light duty gears, the superimposing of these two errors is not noticeably bad, but it produces rather serious difficulties in the production of heavy duty gears.

An object of the present invention, accordingly, is to provide an improved method of generating spiral bevel gear teeth and hypoid gear teeth whereby greater accuracy in the cutting of such teeth is accomplished to provide an improved type of mesh of such gears.

A further object of the invention is to provide a method of the above character wherein the shop development that is required to accomplish the corrective machining of the initial mating gear pair will be greatly simplified. In this connection, in accordance with the present invention, the sensitivity of the gears is substantially reduced and, as a result, the removal of one tooth error can be accomplished without, at the same time, introducing other troublesome and undesirable errors. Moreover, in accordance with the present invention, substantial adjustment of the generating machine settings may be made without accomplishing a radical alteration of the tooth characteristics.

A further object of the invention is to provide a method of the above character by means of which extra heavy duty tooth forms may be cut in a manner such that the limited amount of quietness inherent in the tooth action will not be further diminished by a cutting method that inhibits the full development of the inherent gear characteristics.

Yet another object of the invention is to provide a method of the above character wherein the machine set-up will be common for all types of generators due to the elimination of the cutter tilt settings that have heretofore been required, thus enabling the machine settings to be readily convertible from one design of machine to another.

A further object of the present invention is to provide a method of the above character by means of which a range of normal tooth pressure angles may be generated from the same set of cutting tools, thus providing a freedom in designing to adapt the tooth design to suit service requirements.

Yet another object of the invention is to provide a method of the above character by means of which both members of a mating pair of spiral bevel gears or hypoid gears may be generated with presently available cutting tools, regardless of whether or not the machines are equipped with a cutter tilt mechanism.

The above and other objects of this invention are attained by providing a method in which both mating gears are rendered conjugate to the same imaginary gear whereby errors in the mating gears are largely eliminated and the mating gears will mesh properly with each other. In this method, the movement of the cutting tool and the gear blank or work piece, in the generating action are timed, for both members of a mating gear pair, to the peripheral speed, at the center of the gear face, of a cutting pitch cone whose cone angle is substantially different from the cone angle of the respective operating cones. Preferably the cutter and the work piece are timed for both members of a mating gear pair to the peripheral speed of a cutting pitch cone whose cone angle is substantially the same as the angle of the root plane of the gear.

Moreover, in accordance with the principle involved in the generating method of the present invention, the normal tooth pressure angle and the center of the tooth spiral angle of the generating gear are caused to have different values at the cutting pitch cone than their values at the respective operating pitch cones. This is accomplished by the use of a cutter whose blade angles are non-conventional and timing this cutter in the generating action to a cutting pitch cone whose cone angle is sufficiently different from the cone angle of the respective operating pitch cone, to cause the generation of the required normal operating tooth pressure angles. The required center of the face operating pitch cone spiral angle is obtained by an adjustment of machine settings of the cutter axis.

The utilization of the foregoing factors provides a new control, in the cutting action of the generated shape of the gear tooth. It has been found expedient to apply the new controls to one member, preferably the smaller member of the mating gear pair. The utilization of the controls on one member of a mating gear pair will control the tooth mesh between the mating gears and will serve effectively to control this mesh without the necessity of applying the controls to both mating gear members. Economically the controls are applied to the smaller member of the mating gear pair, as this member has a smaller number of teeth. This permits the freedom in altering the characteristics of the gear tooth behavior and enables the inherent tooth error of bias in to be made larger or smaller, or even controlled in such fashion as to result in a bias out error instead of the conventional bias in error.

In order that the invention may be fully understood, it will now be described in connection with the accompanying drawings, wherein Fig. 1 is a diagrammatic representation of the pitch cone of a spiral bevel gear, showing the relationship of the back cone plane thereto;

Fig. 8a is a diagrammatical projection of the elements of Fig. 8;

Fig. 10 is a further diagrammatical development of the subject-matter of Fig. 9;

Fig. 10a is a view in section showing the cutter tilt angle;

Fig. 11 is a diagrammatical view of the spiral angle of the cutting pitch plane existing in the conventional cutting methods;

Fig. 12 is a diagrammatical illustration of a conventional machine set-up for removing the bias in condition on the concave side of the gear tooth;

Fig. 12a is a view in section showing the cutting tool and work illustrated diagrammatically in Fig. 12;

Fig. 13 is a view similar to Fig. 12 showing the machine set-up for the removal of a bias in condition on the convex side of the gear tooth.

Fig. 13a is a diagrammatical projection of the elements of Fig. 13;

Fig. 14 is a diagrammatical view illustrating the point at which the cutting tool is timed with the rotation of the gear blank, showing the point on the operating pitch cone at which the cutting tool is timed in a conventional gear cutting operation;

Fig. 15 is a view similar to Fig. 14, showing the point at which the cutting tool is timed with the cutting gear blank on the cutting pitch cone;

Fig. 16 is a diagrammatical view showing the relationship of the operating pitch line and the cutting pitch line;

Fig. 17 is a diagrammatical illustration of a cutting tool formed for use in connection with the present invention;

Fig. 18 is a diagrammatical illustration of the relationship of the size of the cutting pitch cones as compared to the sizes of the operating pitch cones, in accordance with the present invention;

Fig. 25 is a diagrammatical illustration showing the direction line of the tooth which is the line passing through the center of the tooth on the developed operating pitch surface and showing a cross-section of the tooth on the operating pitch cone;

Fig. 26 is a view showing a non-twisted tooth;

Fig. 27 is a view similar to Fig. 26 with the bias "in" outline of a tooth shown in dotted lines;

Fig. 28 is similar to Fig. 26 with the bias "out" outline shown in dotted lines;

Figs. 29 and 30 illustrate diagrammatically the nature of the tooth contact that results from the meshing of mating teeth having their teeth twisted in the direction of bias "in";

Figs. 31 and 32 show the nature of the tooth contact resulting from the meshing of mating teeth having their teeth twisted in the direction of bias "out";

Figs. 33 and 34 illustrate the relative tooth contact existing when the gear teeth of the gears of a pair of meshing gears are formed with a corrected twist;

Fig. 35 is a diagrammatical illustration of the increment of machine movements involved in the development of the operating pitch cone;

Fig. 35a is a diagrammatical projection of cutter faces involved in the development of Fig. 35;

Fig. 40a is a projection of the gear element development illustrated diagrammatically in Fig. 40;

Fig. 45 is a partial view in section illustrating the cutting tool on both the concave and convex sides of the gear to be generated in accordance with the present invention;

Fig. 46 is a partial view in section of a cutting tool for generating gears in accordance with the present invention as compared with a conventional cutting tool;

Fig. 47 is an isometric view illustrating the relationship between the operating and cutting pitch planes as compared to the root plane of a gear generated in accordance with the present invention;

Figure 2:
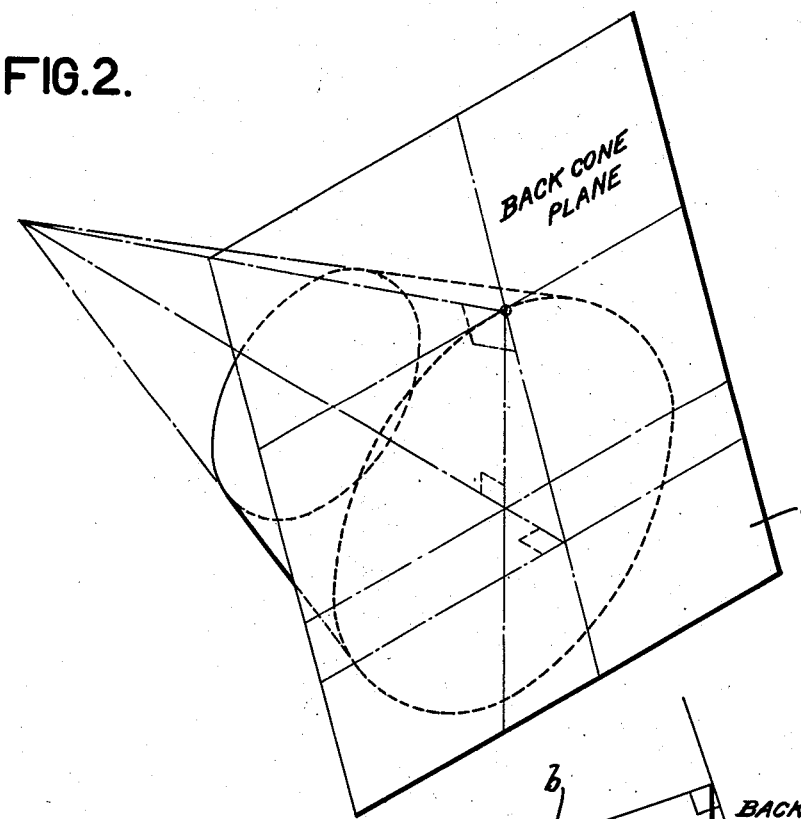
Fig. 2 is a perspective view of the pitch cone of Fig. 1, showing in greater detail the relationship of the back cone plane thereto.
Figure 1:
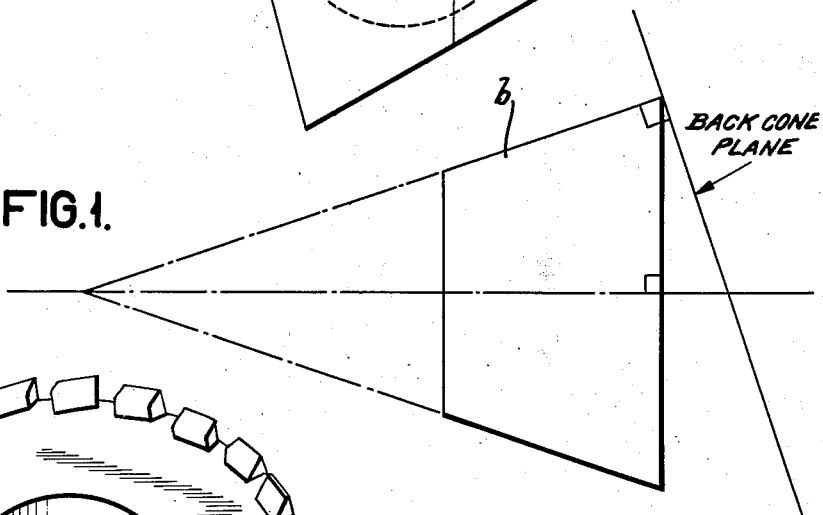

Referring to the above drawings, in order that subsequent relationships may be better understood, Figs. 1 and 2 illustrate the relationship of the back cone plane $a$ to the gear $b$, transverse tooth action taking place in this or in parallel planes.

Figure 3:
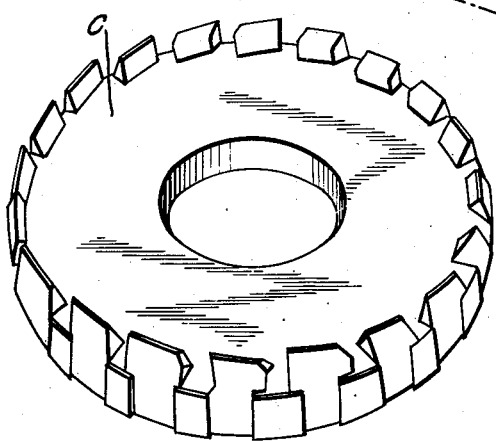
Fig. 3 is a perspective view of a cutting tool utilized in connection with the present invention.

Fig. 3 is an illustration of a conventional cutting tool $c$ in order to facilitate understanding the problems and important aspects of the present invention.

Figure 4:
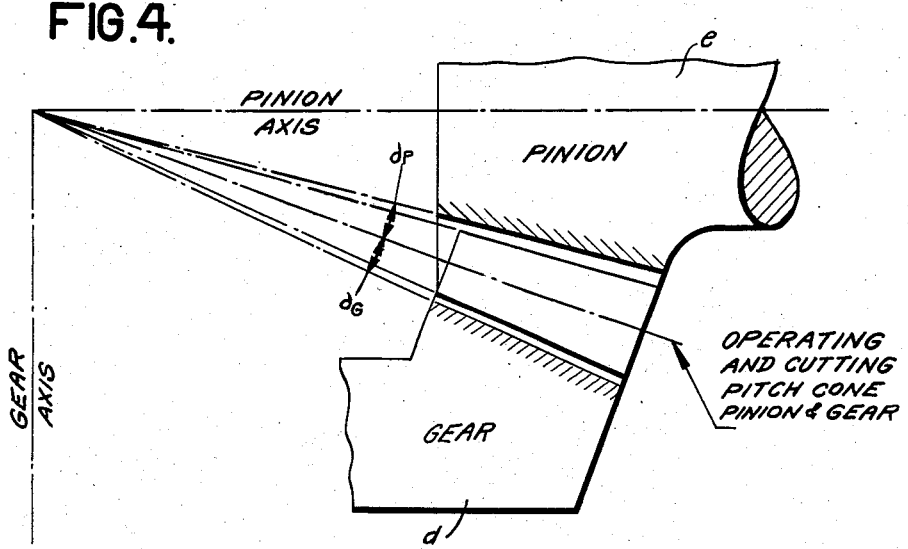
Fig. 4 is a partial view in section of a mating gear of spiral bevel gears, showing the line of tangency through the tooth of both gear members when the teeth are cut by conventional methods.

Fig. 4 illustrates certain relationships taking place in conventional gear cutting mechanisms, particularly, that conventional cutting methods are such that when the apex of the cutting pitch cone of a given gear member coincides with the apex of its respective operating pitch cone, for each of the gears $d$ and pinions $e$, the two respective cutting and operating pitch cones and the two respective cutting and operating dedendum angles $\partial_G$ and $\partial_P$ will coincide.

Figure 5:
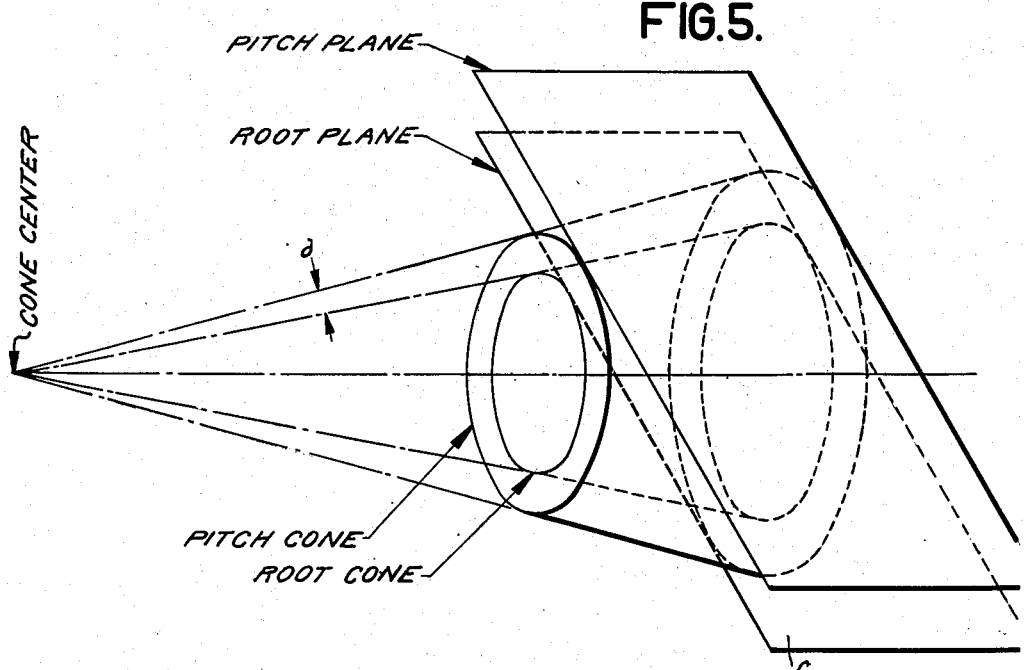
Fig. 5 is an isometric view of the relationship between the pitch and root planes and the pitch and root cones of a spiral bevel gear; the teeth of which are generated by conventional cutting methods.

Fig. 5, together with its legends, is a further help in understanding the general problems involved in connection with the present invention. The plane of the cutter and the generating cutter motions, of necessity, must occur in a plane parallel to the root plane $f$. The root and pitch planes, however, if extended to the cone center, meet in a common line and these two planes, accordingly, are separated by the amount of the dedendum angle $\partial$. The generating cutter motion, therefore, takes place in a plane that is tilted with respect to the pitch plane by the amount of the dedendum angle.

Figure 6:
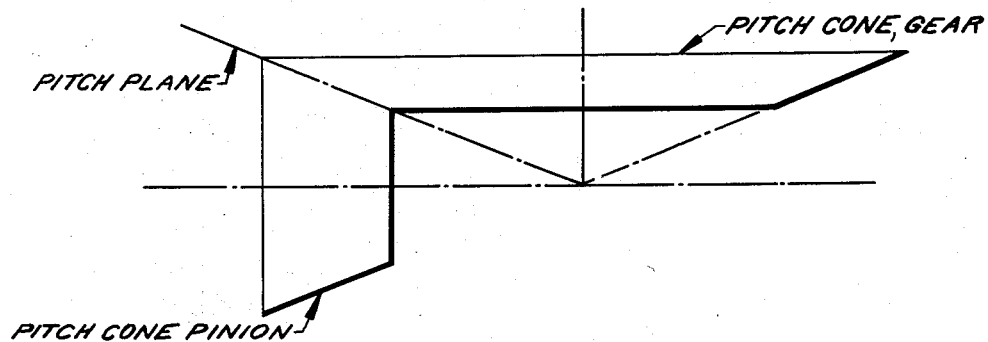
Fig. 6 is a plan view of the pitch elements of a mating pair of gears, the teeth of which are cut by conventional methods.
Figure 7:
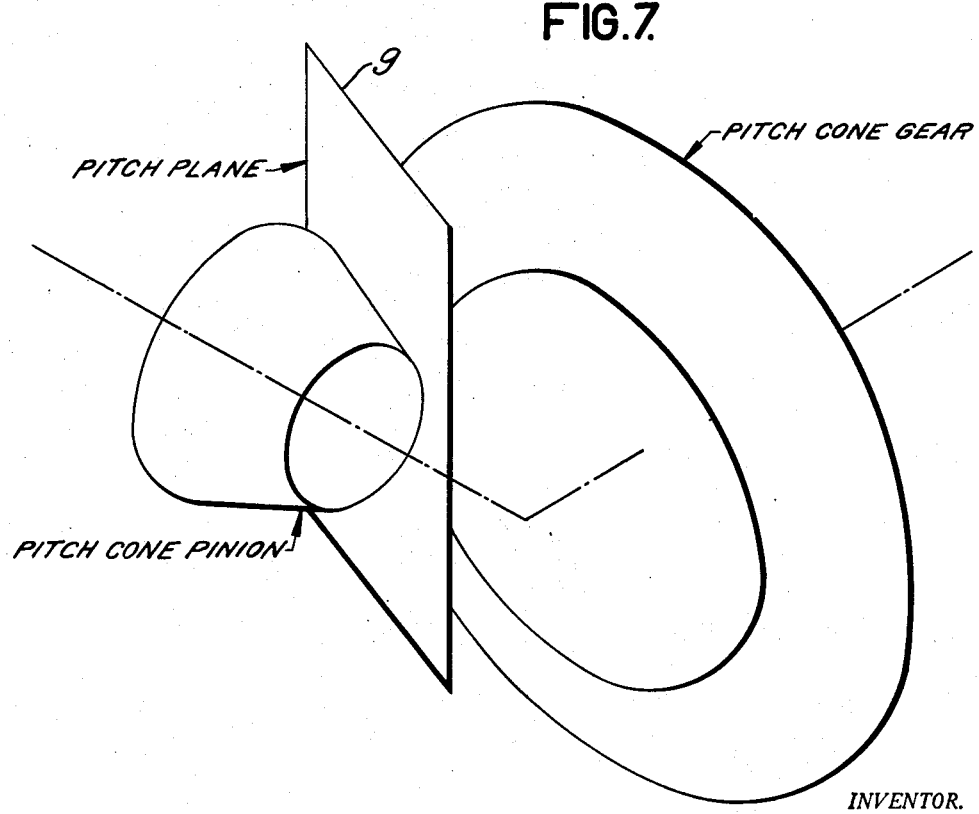
Fig. 7 is an isometric view of the elements of Fig. 6.

As will be seen in Figs. 6 and 7, the pitch plane $g$ forms a common tangent plane between the two contacting pitch cones of the gear and pinion.

Figure 8:
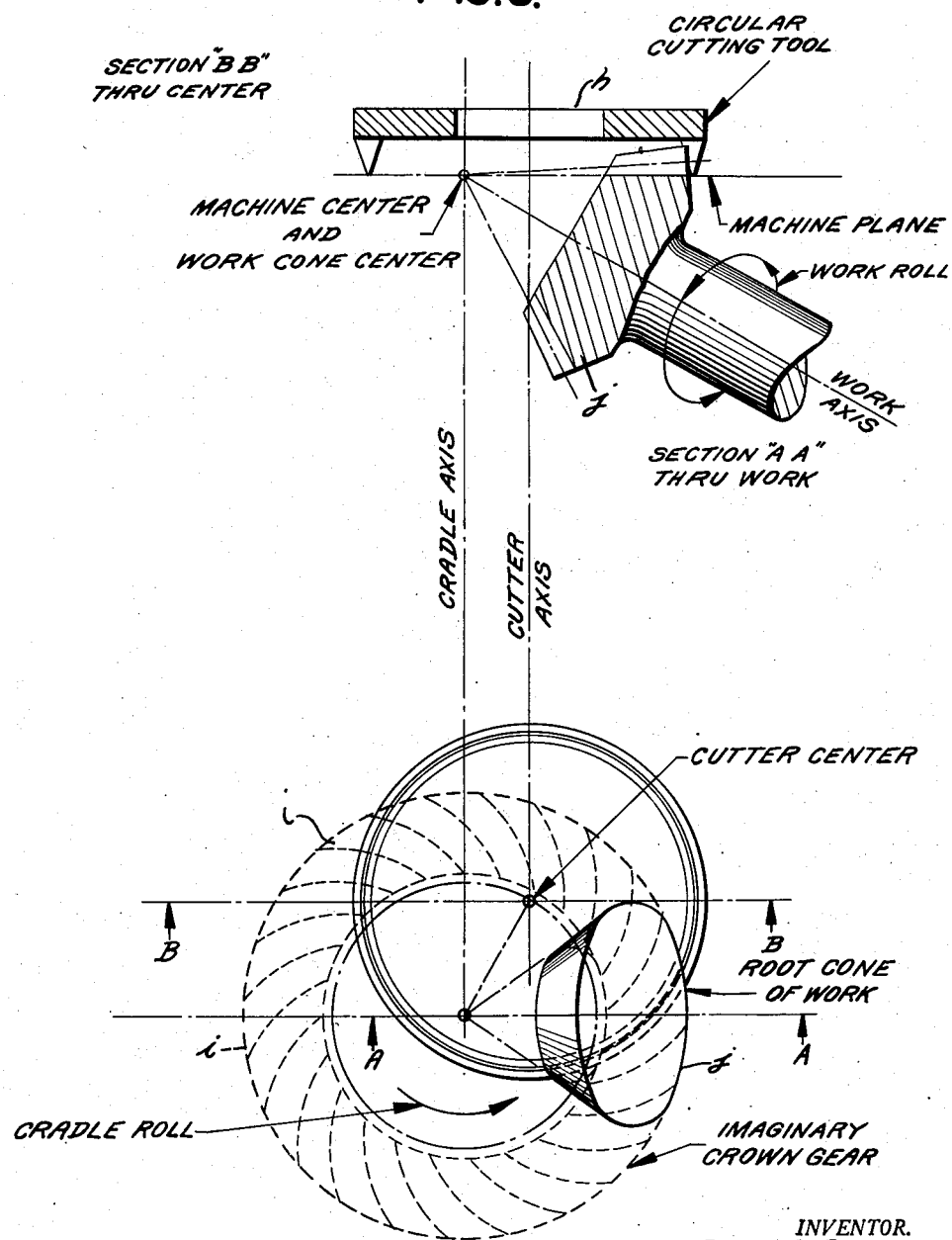
Fig. 8 is a diagrammatical representation of an initial machine set-up where the apex of the operating pitch cone of the gear coincides with the machine center of roll.

As will be understood by those skilled in the art, the cradle upon which the cutting tool $h$ is mounted is adapted to rotate in such fashion that the cutting edge of the cutting tool generates an imaginary crown gear $i$ that engages with the teeth that are being cut on the gear blank or work piece $j$. The machine center of the roll, accordingly, in conventional cutting practice, coincides with the work cone center, as illustrated in Fig. 8, and the center of the cutting tool thus travels in a circle about the machine center and work cone center. The axis of the imaginary crown gear is normal to the root line of the gear, said root line lying in a machine plane. The generating roll of the cradle causes the turning of the imaginary crown gear and thus the generating movement of the cutting gear. For conventionally cut gears, the turning of the imaginary crown gear is timed with the operating pitch cone of the gear to be cut, at the center of the gear face.

Figure 9:
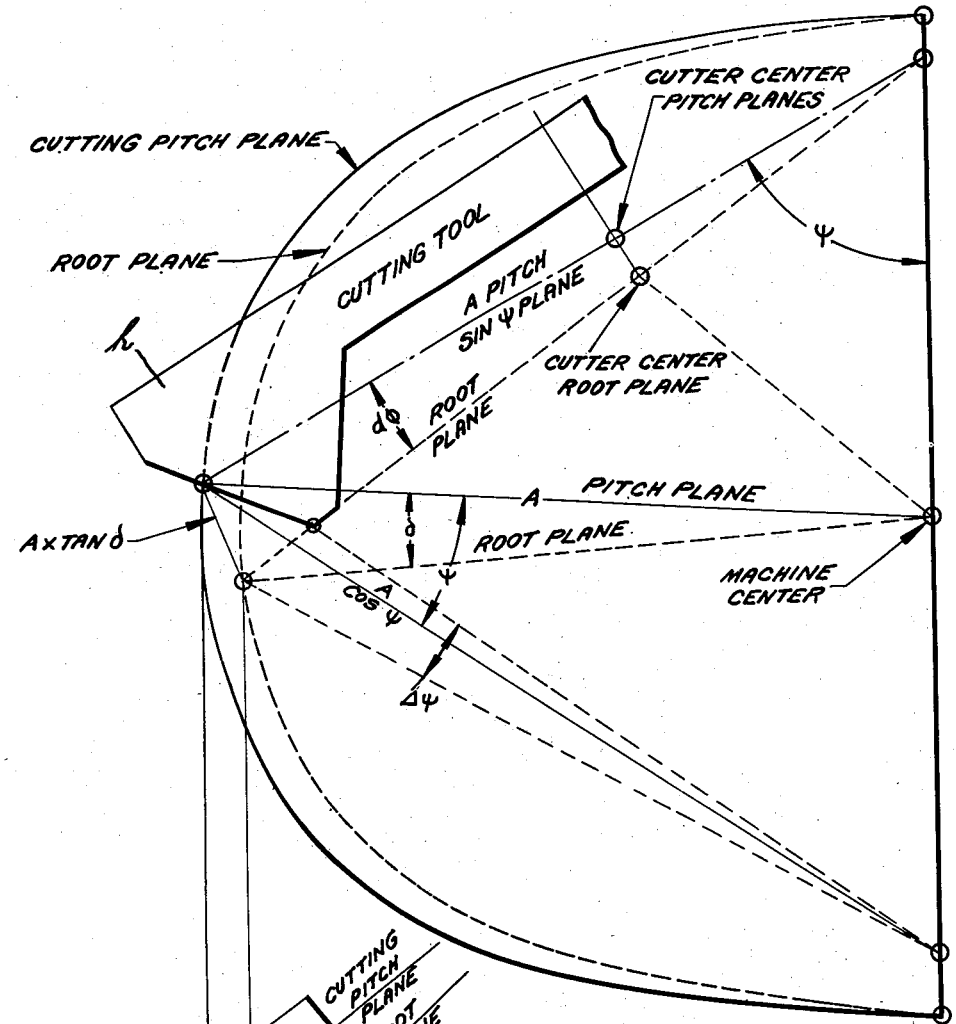
Fig. 9 is a diagrammatical illustration showing the pitch and root planes of Fig. 5, together with a sectional view of the cutting tool taken through the cutter axis.
Figure 9A:
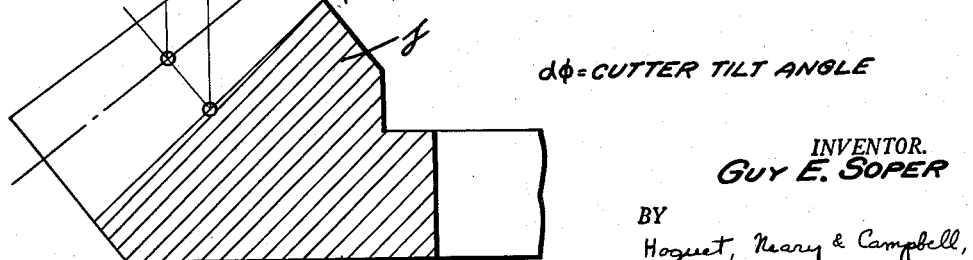
Fig. 9a is a view in section through the cutter shown in Fig. 9.

In Fig. 9, the relationship of the cutting pitch plane and root plane will be seen as giving rise to the cutter tilt angle that is illustrated by the symbol $d\phi$. The cutting pitch plane intersects the root plane in a straight line passing through the machine center or apex of the cutting pitch cone, as above stated, and the operating pitch plane intersects the root plane in a straight line passing through the apex of the cutting pitch cone. The cutting pitch plane is separated from the root plane by the amount of the cutting dedendum angle, when taken in a direction from the center of the gear face to the machine center, and these two planes are separated by the amount of the angle $d\phi$, the cutter tilt angle, when taken in a direction from the center of the gear face to the cutter axis. The cutter tilt angle, $d\phi$, is the true amount the plane of the cutting tool is tilted to the cutting pitch plane of the gear to be cut.

From Fig. 9, the following equation will be apparent:

$$\text{Tan } d\phi = \sin \psi \times \tan \partial$$

Because of the fact that the top-lands of the cutter blades must travel in the root plane, thus causing the plane of the cutter $h$ to be tilted by the amount of the cutter tilt angle, $d\phi$, to the cutting pitch plane of the gear $j$ to be cut, the generated normal cutting pitch line pressure angle of the gear tooth will be different from the blade angle of the cutting tool. This generated normal cutting pitch line tooth pressure angle will be larger than the outside blade angle of the cutting tool for the concave side of the gear tooth and smaller than the inside blade angle of the cutting tool for the convex side of the gear tooth. This will be seen from Fig. 10 and the appropriate legends applied thereto, and it will be seen that it is necessary to add $d\phi$ to the outside blade angle and subtract $d\phi$ from the inside blade angle to obtain the generated normal cutting pitch line tooth pressure angle.

From an inspection of Fig. 11, it will be seen that, because of practical limitations, the cutter diameter limits the actual cutter center position such that the actual circular path of the cutter blades causes a variation in the spiral angle from end to end of the gear tooth. The spiral angle is illustrated by the reference character $\psi$ and is usually larger in the large end of the gear blank than at the small end. To obtain a uniform spiral angle, the cutter diameter would have to be just such that the cutter center position would fall on a point obtained by dividing the mean cone distance by the sine of the mean spiral angle.

As shown by the equation for the cutter tilt angle, $d\phi$, above stated, the cutter tilt angle becomes a variable along the length of the gear tooth due to the variation of the cutting pitch line spiral angle. Due to the fact that the cutter tilt angle, $d\phi$, represents the difference between the generated normal pitch line tooth pressure angle and the blade angle of the cutting tool, and due to the fact that the blade angle of the cutting tool cannot vary in value as it travels from end to end of the gear tooth, a variation in the cutter tilt angle, as the cutter blade travels from end to end of the gear tooth, will cause a variation in the generated normal pitch line tooth pressure angle throughout the length of the gear tooth, when the gears are cut by the machine set-up illustrated in Fig. 8. This variation in the generated normal pitch line tooth pressure angle is a tooth error that is commonly known as a bias "in" condition.

In Fig. 12, there is illustrated a conventional machine set-up on the concave side of the gear tooth. In this set-up, the gear is advanced so that the cone center is placed beyond the machine center of roll. This causes a reduction in size of the imaginary crown gear which in turn removes the bias. Thus, in prior practice the opposite sides of the gear are cut to mesh with crown gears of different size, an obviously undesirable condition. Other machine settings must be altered to follow up the change in gear blank position so that the cutter blades will have the same relationship in position and timing, with respect to the gear blank that they had in the set-up of Fig. 8.

As illustrated in Fig. 13, the removal of the bias "in" condition on the convex side of the gear tooth is accomplished by withdrawing the gear blank away from the machine center and changing the other machine settings accordingly. This causes an increase in the size of the imaginary crown gear which effects the removal of the bias.

When conventionally cut spiral bevel gears have their teeth cut by the machine set-up of Fig. 8, resulting in the bias "in" condition above mentioned, they will operate together, on each gear member's designed mounting position, with a tooth contact illustrated in Figs. 29 and 30. When these conventional spiral bevel gears have their bias in error, resulting from the Fig. 8 set-up corrected by the machine set-ups of Figs. 12 and 13, the resulting tooth contact for the gears in mesh, with each member operating on its respective designed mounting position, will result in a troublesome type of tooth contact that becomes quite noticeable on the heavy duty tooth form. Where the tooth is stubbed, the pressure angle is large, and the diametral pitch is coarse. When this condition becomes severe, it causes the heat treatment distortions to become more detrimental and impairs the gear lapping qualities and the subsequent sensitivity of assembly adjustments.

From the foregoing, it is seen that the cause of the cutting difficulties above described as being involved in the conventional method of generating spiral bevel gears is due to the cutter tilt angle. Moreover, from the foregoing discussion, it will be seen that the only independent variables are the spiral angle and the dedendum angle. The spiral angle varies from end to end of the gear tooth but the dedendum angle remains constant. The dedendum angle thus merely magnifies the errors caused by the variable spiral angle, and attempts heretofore to correct the bias condition, and involving the machine set-ups of Figs. 12 and 13, impart characteristics to the gear that, under certain circumstances, causes it to become extremely sensitive, especially for the heavy duty tooth form, when the corrective machining of the shop-development process is applied. All of the preceding difficulties arise because the gear cutting machines are not designed properly to simulate a common basic member for the generation of the two mating gear members. The basic principle of gear generation is the requirement of a common basic member so that both the pinion, or smaller mating member, and the gear, or larger member, are generated so as to be conjugate to the common basic member, and thus making the gears automatically conjugate to each other. When there is a lack of a common basic member, this basic principle of generation no longer holds true.

The method of the present invention is accomplished by timing the cutting tool and gear blank at a point on the cutting pitch cone instead of on a point on the operating pitch cone. This cutting pitch cone differs in size from the operating pitch cone and is preferably made smaller than the operating pitch cone. The point of timing on this cutting pitch cone is located basically at the same distance from the cone center as the point of timing for conventional tooth generation, which, as above stated, is on the operating pitch cone.

In generating gear teeth in accordance with the present invention, it is not necessary to provide a cutter tilt machine set-up and, in the present specification, the plane of the generating action of the cutting tool will be considered sufficiently displaced from the operating pitch plane, for the gear and for the mating pinion, to create, in the generating action, both the required normal tooth operating pressure angle and mating normal tooth operating pressure angles, at the center of the gear face, as a result of which no cutter tilt set-up will be required. A non-cutter tilt machine set-up can be employed in unison with a control on the dedendum angle and on the spiral angle.

Also, in accordance with the present invention, where the cutting pitch cone differs in size from the operating pitch cone, non-conventional cutter blade angles will be required. It will be apparent that the departure of the cutter blade angles from conventional values, together with a change in the timed relationship, in the generating action, between the movement of the cutting tool and the generating roll of the gear blank so as to maintain the required normal gear tooth pressure angle will effect a change in the size of the cutting pitch cone as compared to the size of the operating pitch cone. The cutter blade angles are preferably made smaller than the conventional values in cutting both the concave and convex sides of the tooth. For example, assume that a gear has a normal pressure angle of 20°, a dedendum angle of 3°, and a spiral angle of 35°. A non-tilt cutter set-up with conventional generation requires a cutting tool having an outside blade angle (for cutting the concave side of the gear tooth) of 20°−3°×sin 35° or 18° 17', and an inside blade angle for cutting the convex side of the gear tooth of 20°+3°×sin 35° or 21° 43'.

In accordance with the present invention, this gear can be generated by a non-tilt cutter set-up even though the cutter blade angles differ from those given above. For example, a 17° 30' pressure angle cutter having a cutter member of 12½ could be used. Such a cutter would have an outside blade angle of 17° 30'−10×12½ (min.) or 15° 25', and an inside blade angle of 17° 30'+10×12½ (min.) or 19° 35'.

Referring to the above drawings, Fig. 14 illustrates the manner in which timing is accomplished in conventional methods of generation. It will be seen that the point of timing indicated at 1 is located on the operating pitch line. On the other hand, in Fig. 15 the timing, in accordance with the present invention, occurs at a point on the cutting pitch cone which is distant from the cone center equal to that of point 1. The timing point in accordance with the present invention is indicated at 2 in Fig. 15.

Fig. 16 illustrates the relationship of the timing point when the pinion is cut by a conventional method as well as by the present invention, the operating pitch line and the cutting pitch line being illustrated.

Fig. 17 illustrates the blade angles for cutting tools utilized in conventional cutting methods, as well as those utilized in accordance with the present invention. The solid lines represent a cutting tool formed in accordance with the present invention, whereas the dotted lines represent conventional cutting tools. In this figure, the angle $\phi_0'$ shows the outside blade angle for cutting in accordance with the present invention, the angle $\phi_0$, the outside blade angle for conventional cutting; the angle $\phi_L'$, the inside blade angle in accordance with the present invention; and the angle $\phi_L$, the inside angle for conventional cutting. The mismatch for the outside blade angle, which can be represented by the term $\Delta\phi_0$ equals $\phi_0-\phi_0'$, whereas the mismatch for the inside blade angle which can be termed $\Delta\phi_L$ equals $\phi_L-\phi_L'$.

A plus mismatch will make the cutting pitch cone smaller than the operating pitch cone and, to maintain the required normal gear tooth pressure angle, a non-conventional relationship between the movement of the cutting tool and the generating roll of the gear blank during the generating process must be utilized. This non-conventional relationship is obtained by altering either the cradle or the work roll from their conventional values. It is more expedient to utilize the conventional cradle roll and alter the work roll and, if a conventional cradle roll is utilized, the amount of work roll alteration is expressed by the formula.

$$\Delta WR = WR \frac{\tan \phi \cdot \tan \Delta \phi}{\cos^2 \psi} \qquad (2)$$

If the mismatch in cutter blade angles is a plus value, an increase in the work roll results.

A mismatch in the cutter blade angles will also alter the size of the cutting pitch cone as compared to the operating pitch cone. The following formulas for the pinion and gear will apply to express the difference between the operating and cutting pitch angles:

Let the difference between the operating cutting pitch angle equal $d\partial_{CP}$ for the pinion and $d\partial_{CG}$ for the gear.

$$\text{Tan } d\partial_{CP} = \frac{\tan \phi \tan \Delta \phi}{(\cot \gamma + \tan \partial_P) \cos^2 \psi} \qquad (3)$$

$$\text{Tan } d\partial_{CG} = \frac{\tan \phi \tan \Delta \phi}{(\cot \Gamma + \tan \partial_G) \cos^2 \psi} \qquad (4)$$

Fig. 18 illustrates the sizes of the cutting pitch cones as compared to the operating pitch cones when the same plus cutter blade mismatch is employed for both members of the mating pair of gears. The larger departure of the cutting cone from the operating cone occurs on the member having the larger number of teeth as will be seen clearly in Fig. 18 for the gear member.

Figure 19:
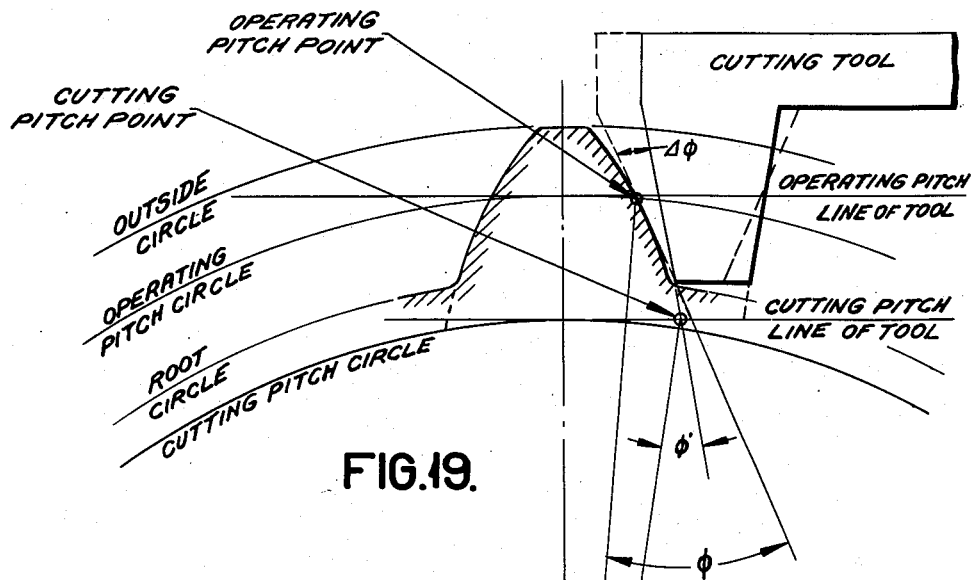
Fig. 19 is a diagrammatical illustration in the back cone plane showing the relationship of the cutting tool to the gear blank and showing the conventional cutting tool in dotted outline.

Fig. 19 shows the difference in relationship of the cutting faces of the cutting tool for conventional operations and operations in accordance with the present invention. The dotted lines illustrate the conventional cutter whereas the solid lines show the cutter of the present invention. The mismatch in cutter blade angles as between these two cutting tools and illustrated by the legend $\Delta\phi$ has caused the movement of the cutting tool in the generating action to be timed to a cutting pitch circle instead of an operating pitch circle, as illustrated by the legends in Fig. 19. If the cutter blade angle mismatch is a plus value, the size of the cutting pitch cone as compared to the size of the operating pitch cone will be smaller than the size of the operating pitch cone.

Figure 20:
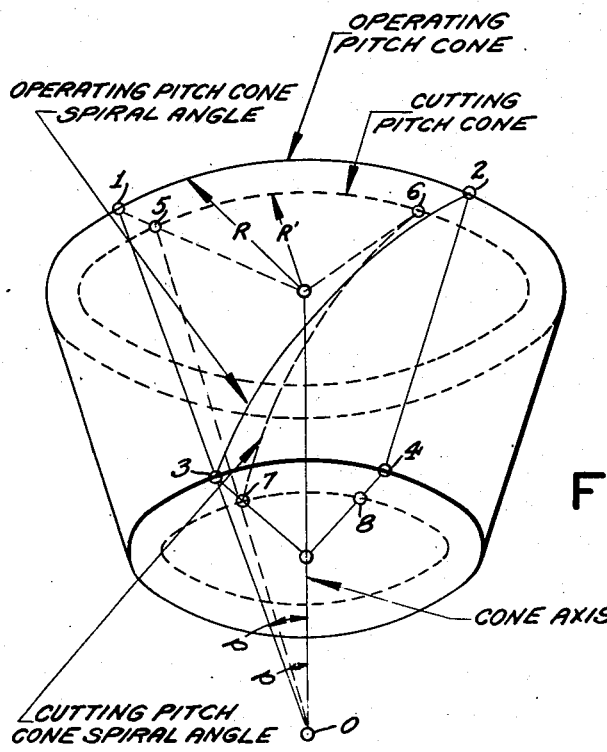
Fig. 20 is a diagrammatical illustration of the spiral angle of the gear teeth on the operating pitch cone and on the cutting pitch cone.
Figure 21:
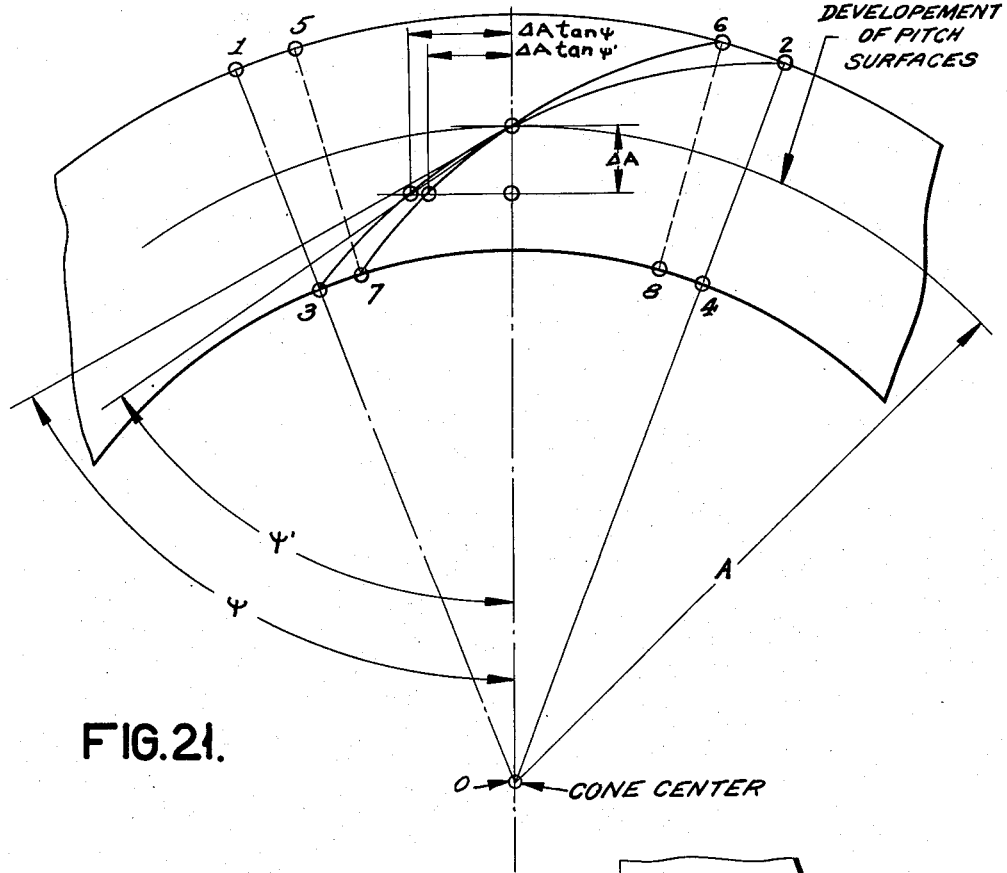
Fig. 21 is a diagrammatical view showing the spiral angles of Fig. 20 in the same plane.

As above stated, when a mismatch in cutter blade angles is employed, the cutter axis in setting up the machine must be adjusted to the spiral angle on the cutting pitch cone. Figs. 20 and 21 illustrate the difference between the spiral angle on the operating pitch cone and the spiral angle on the cutting pitch cone for the condition where a plus cutter blade angle mismatch has reduced the size of the cutting cone. It will be seen that the spiral angle on the smaller cone will be reduced, the difference between the operating and cutting spiral angles being indicated by the legend So that, $$\Delta \psi = \psi - \psi' \qquad (5)$$

$$\text{Tan } \Delta \psi = \tan \psi \tan \phi \tan \Delta \phi \qquad (6)$$

Figure 22:
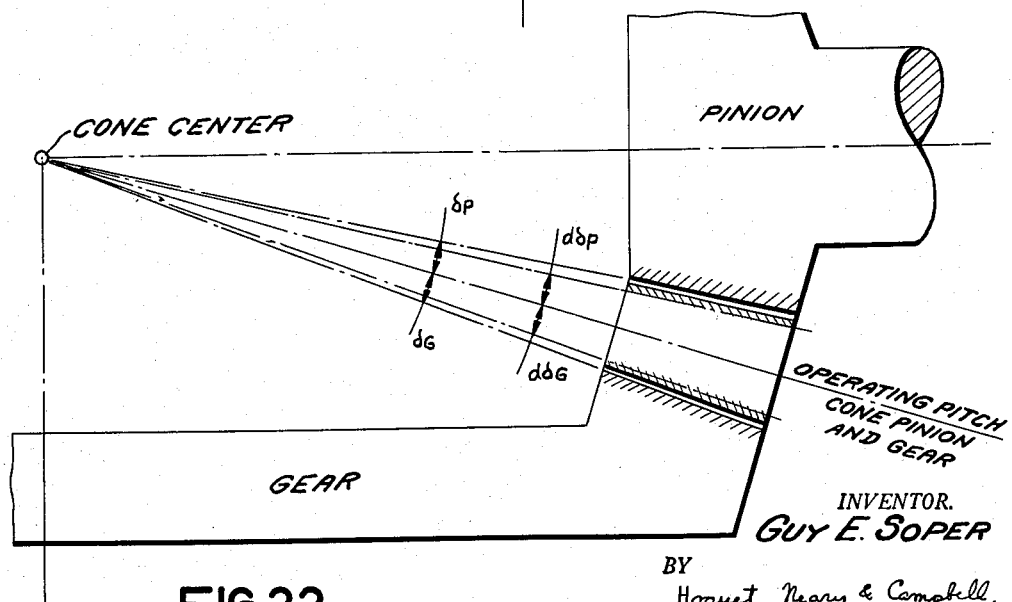
Fig. 22 shows diagrammatically the corrections in the pinion and gear dedendum angles that effect the position of the cutting tool.

The position of the cutting tool, in order to match mating profiles, in accordance with the present invention, is different than in conventional generation. Fig. 22 illustrates the corrections in the pinion and gear dedendum angles that effect the proper position of the cutting tool. In conventional generation, if $\Delta A$ represents the displacement of the operating pitch cone center from the machine center of roll, as measured along the cone distance, that will position one member of a mating gear pair with respect to its cutting tool, the positioning of the cutter for one member of a mating gear pair to match the mating profiles is given by the formula $$\Delta A = \frac{A \times H \times \tan \phi}{V \times \cos \psi}(\tan \partial_P + \tan \partial_G) \qquad (7)$$

in which A is the cone distance to the center of the face; H is the roughing horizontal machine setting; and V is the roughing vertical machine setting.

In accordance with the present invention, the position of the cutter for one member of a mating gear pair that will match the mating profiles is altered from Equation 7 as follows:

$$\Delta A = \frac{A \times H \times \tan \phi}{V \times \cos \psi}\left(\tan \partial_P + \tan \partial_G - \frac{\tan d\partial_P + \tan d\partial_G}{2}\right) \qquad (8)$$

Where, $$\text{Tan } d\partial_P = \frac{\tan \psi \tan \Delta\phi_P}{\cos \psi} \qquad (9)$$

and, $$\text{Tan } d\partial_G = \frac{\tan \psi \tan \Delta\phi_G}{\cos \psi} \qquad (10)$$

In cutting operations, the cutting tool is preferably positioned for the smaller member of the gear pair only.

Figure 23:
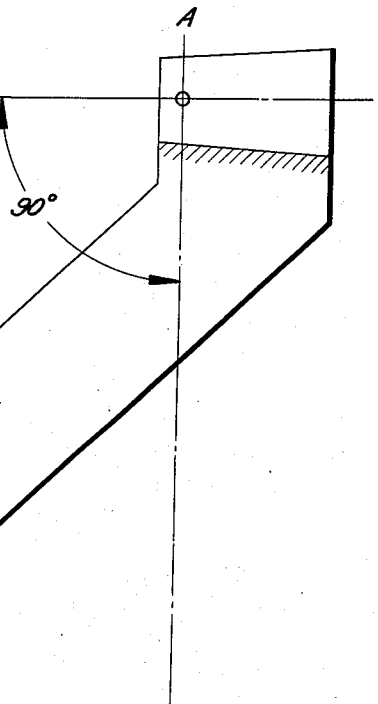
Fig. 23 is a diagrammatical illustration of a radius line drawn normal to the operating pitch cone and terminating in the gear axis.
Figure 24:
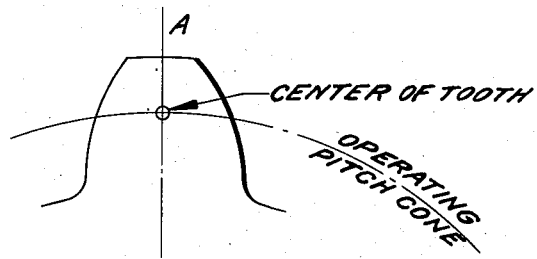
Fig. 24 is another view of the radius line of Fig. 23.

Conventional spiral bevel gears have their teeth twisted with respect to their own operating pitch cones. Figs. 23 and 24 show a radius line A—B drawn normal to the operating pitch cone and terminating in the gear axis. Fig. 25 shows a curved line C—D passing through the center of the gear teeth on the developed operating pitch surface. This curved line is described by a radius always 90° to the pitch surface as it intersects the pitch cone at the center of the tooth on the pitch surface in moving along the axis of the cone and may be termed the directional line of the tooth on the pitch surface. A gear tooth that is not twisted with respect to its own operating pitch cone is illustrated in Fig. 26, and the structure of this tooth is such that the tooth remains symmetrical to the line A—B of Figs. 23 and 24 as the line A—B is moved along the curve C—D of Fig. 25.

Figs. 27 and 28 illustrate the difference between twisted and non-twisted teeth, a tooth K being illustrated in these figures in solid outline as being a non-twisted tooth such as illustrated in Fig. 26, whereas the dotted outline of Fig. 27 shows a tooth that is twisted in the direction of bias "in" while the different outline of Fig. 28 shows a tooth that is twisted in the direction of bias "out."

Figs. 29 and 30 illustrate the nature of the tooth contact resulting from the meshing of mating teeth that are twisted in the direction of bias "in." The area of contact is illustrated by the reference character L, and it will be seen that this area is oriented so that it is at an angle to the directional line of the tooth. Figs. 31 and 32 show the area of contact M between teeth having a twist in the direction of bias "out." Here again, the orientation of the contact area is at an angle to the directional line of the tooth but in the opposite respect where the tooth is in the direction of bias "in."

Figs. 33 and 34 illustrate the tooth contact N existing and between teeth of mating gears in which the teeth of one gear are twisted in such fashion as to correct for the character of the twist in the other gear.

In accordance with the present invention, the larger member of the gear pair is generated with mismatched cutter blade angles and the teeth of this member are therefore never twisted as much in the direction of bias "in" as the teeth of a corresponding larger member of a conventional gear pair. In Equation 10, when $d\partial_G$ is twice the size of $\partial_G$, the teeth of the larger member of a gear pair of the present invention will be non-twisted with respect to their own operating pitch cone. When $d\partial_G$ is more than twice the size of $\partial_G$, the resulting teeth will be twisted in the direction of bias "out" (Fig. 28) instead of in the direction of bias "in" (Fig. 27). The teeth of the smaller member of a gear pair, in accordance with the present invention, must be twisted to conform to the twist of its mating larger member when the tooth mesh between the mating profiles is positioned, as illustrated in Figs. 33 and 34. Thus, the cutting tool of this smaller member must be positioned accordingly. Inasmuch as the teeth of the larger member of a gear pair, in accordance with the present invention, are twisted non-conventionally, the resulting mating teeth of the smaller gear member must also be twisted non-conventionally.

Fig. 35 illustrates the increment of machine movements in the development of the operating pitch cone. As will be seen from the legends in Fig. 35, an increment rotation of the angle $\Delta\theta$ about the machine center O will move the cutter center from the point 1 to point 2 and will move the point 3 to point 4, the cutter normally from point 5 to point 6 and in a transverse direction from point 5 to point 7, and the cutter transversely, normal to its cutting edges, from point 5 to point 8 or a distance of $\Delta X$. The distance $R_a$ is proportional to the work roll and the angle is proportional to the cradle roll. The following formula obtains:

$$\Delta X = \frac{R_a \times \Delta\theta \times \cos \phi t}{\cos \psi} \qquad (11)$$

and it will be seen that when the work roll is changed, $R_a$ becomes $R_a'$.

Figure 36:
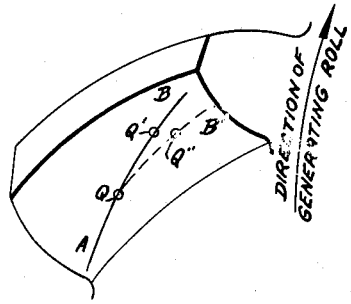
Figs. 36 and 37 illustrate the relationship of tooth contact and the amount of twist existing in the gear teeth.

Referring to Fig. 36, the curvature of line A—B determines the amount of twist existing in the gear tooth. Points Q and Q' are on the line A—B.

Figure 37:
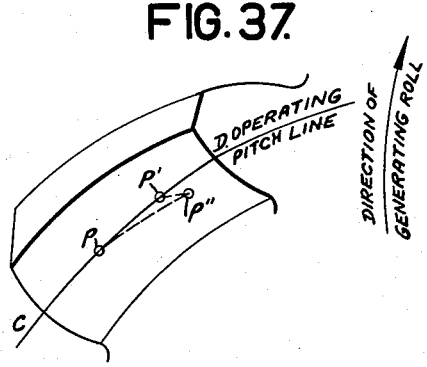
Figure 38:
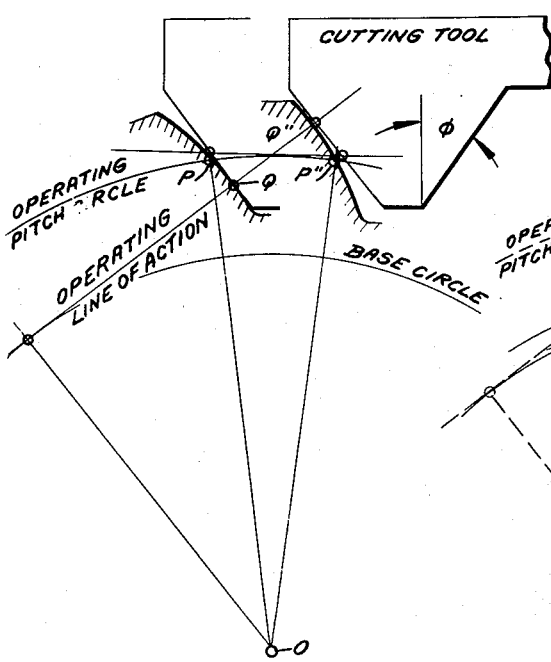
Fig. 38 is a diagrammatical illustration showing the relationship of the points on the gear teeth shown in Fig. 36 to the cutting tool.
Figure 39:
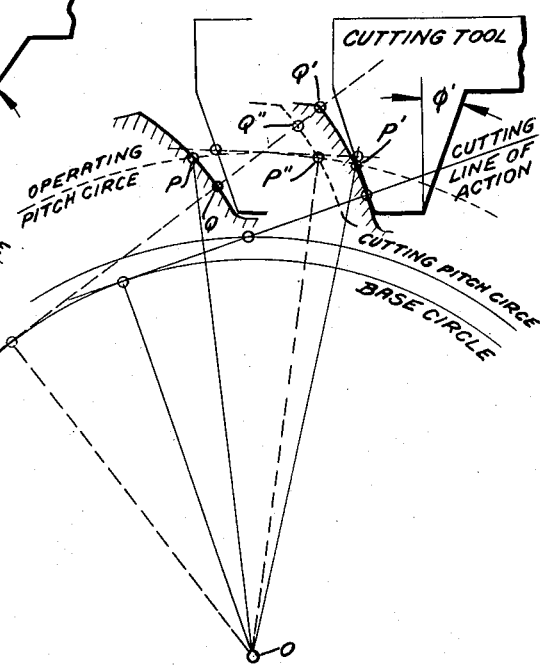
Fig. 39 is a view similar to Fig. 38 showing the relationship of the points on the gear shown in Fig. 37 to the cutting tool.

Should the tooth profile contain the points Q and Q″, it would be twisted in a direction of bias "in" as compared to the tooth containing the line A—B, as illustrated in Fig. 36. In Fig. 37, the operating pitch line C—D is also determinative of the amount of twist existing in the gear tooth. Figs. 38 and 39 show that the points Q and Q″ are generating points on the operating line of action when the cutting tool is timed with the operating pitch circle. Points Q′ and Q″ are points on the operating line of action when the cutting tool is timed with the cutting pitch circle. The separation of points Q′ and Q″ of Fig. 39 is the cause of the change in the twist of the tooth of Fig. 36. Figs. 38 and 39 show that the points P, P′ and P″ are points on the operating pitch circle corresponding to points Q, Q′ and Q″ on the operating line of action, and therefore the curvature of the line C—D in Fig. 37 will determine the amount of twist as readily as the curvature of the line A—B in Fig. 36.

For convenience, the alteration in effective movements, that is, P′—P″ of Fig. 39, between the generating roll of the gear blank and the generating movement of the cutting tool, due to timing on a cutting pitch cone, will be considered as a change in cutter speed rather than a change in gear speed.

Figure 40:
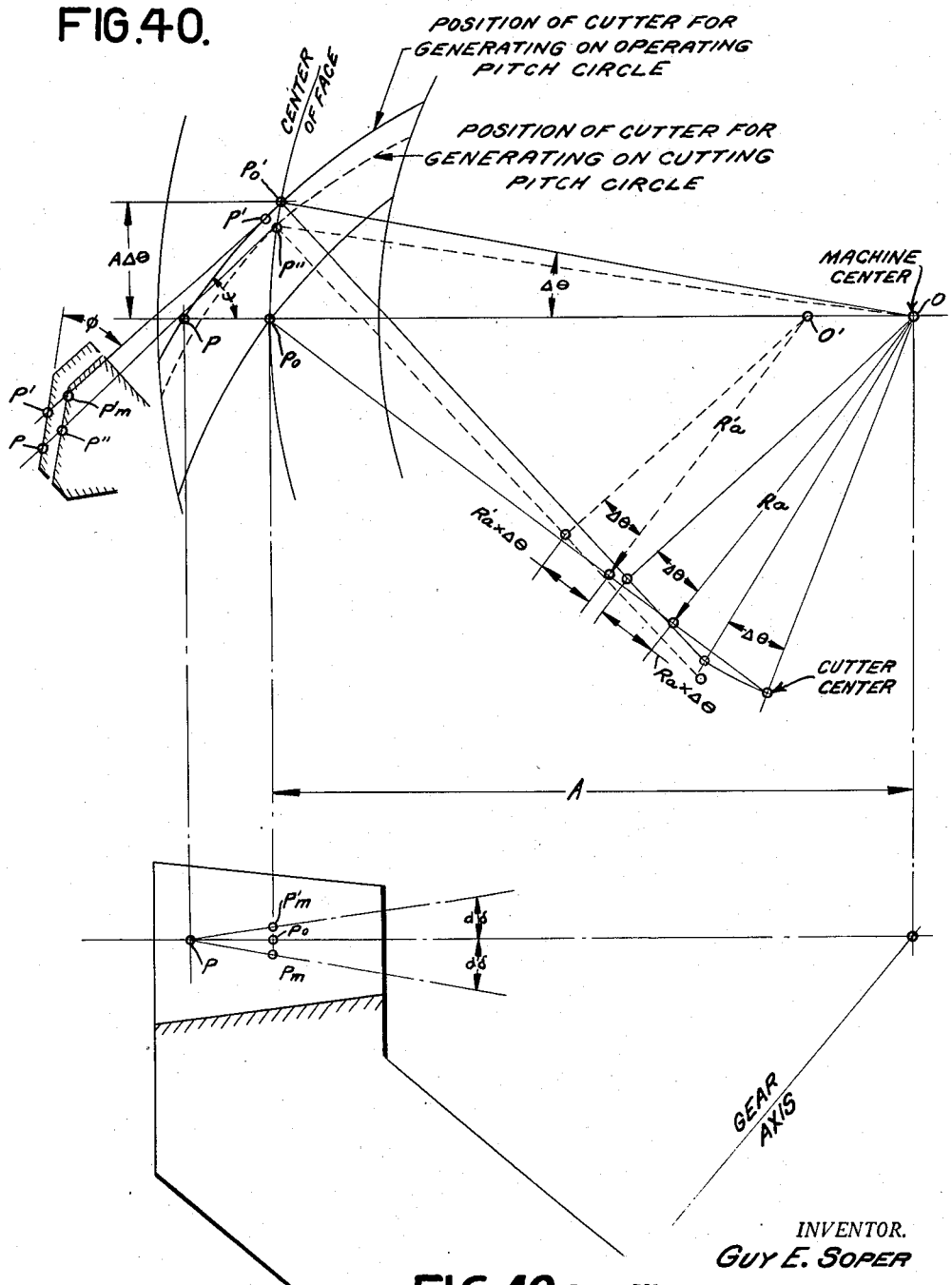
Fig. 40 is a diagrammatical illustration showing the cutter action taken in plane tangent to the operating pitch cone.

Fig. 40 is a diagrammatic illustration of the cutter action taken in a plane tangent to the operating pitch cone. Normally, the cutter rotates about the point O and an angular rotation of $\Delta\theta$ will move the cutter from point $P_0$ to point $P_0'$ at the center of the gear face.

A change in the cutter speed can be obtained only by considering the cutter as rotating about a false center, for example, about O′. With point O′ as a center, the cutter will travel from point $P_0$ to point P″ at the center of the gear face due to the angular rotation of $\Delta\theta$. The distance P″—$P_0'$ represents the amount of cutter retardation in the transverse plane. Distance P″—P′ represents the amount of cutter retardation in the normal plane. The normal movement of the cutting tool when point O is the center of rotation is $R_a \times \Delta\theta$, and the normal movement when point O′ is the center of rotation is $R_a' \times \Delta\theta$. Thus, the normal retardation of the cutter, due to rotating about point O′ instead of point O, is equal to $(R_a - R_a')\Delta\theta$, and the effective change in the dedendum angle that achieves a correction of the twist in the gear tooth is given by the formula $$\tan d\partial = \frac{\tan \psi \tan \Delta\phi}{\cos \psi} \quad (53)$$

The angle $d\partial$ represents the angular departure, in the direction of the dedendum angle, of the line of mesh between the operating pitch line and the cutting edge of the tool and is caused by the alteration of the timed relationship between the generating rolls of the imaginary crown gear and the gear blank due to the timing of the generating movement with the cutting pitch cone instead of with the operating pitch cone.

Figure 41:
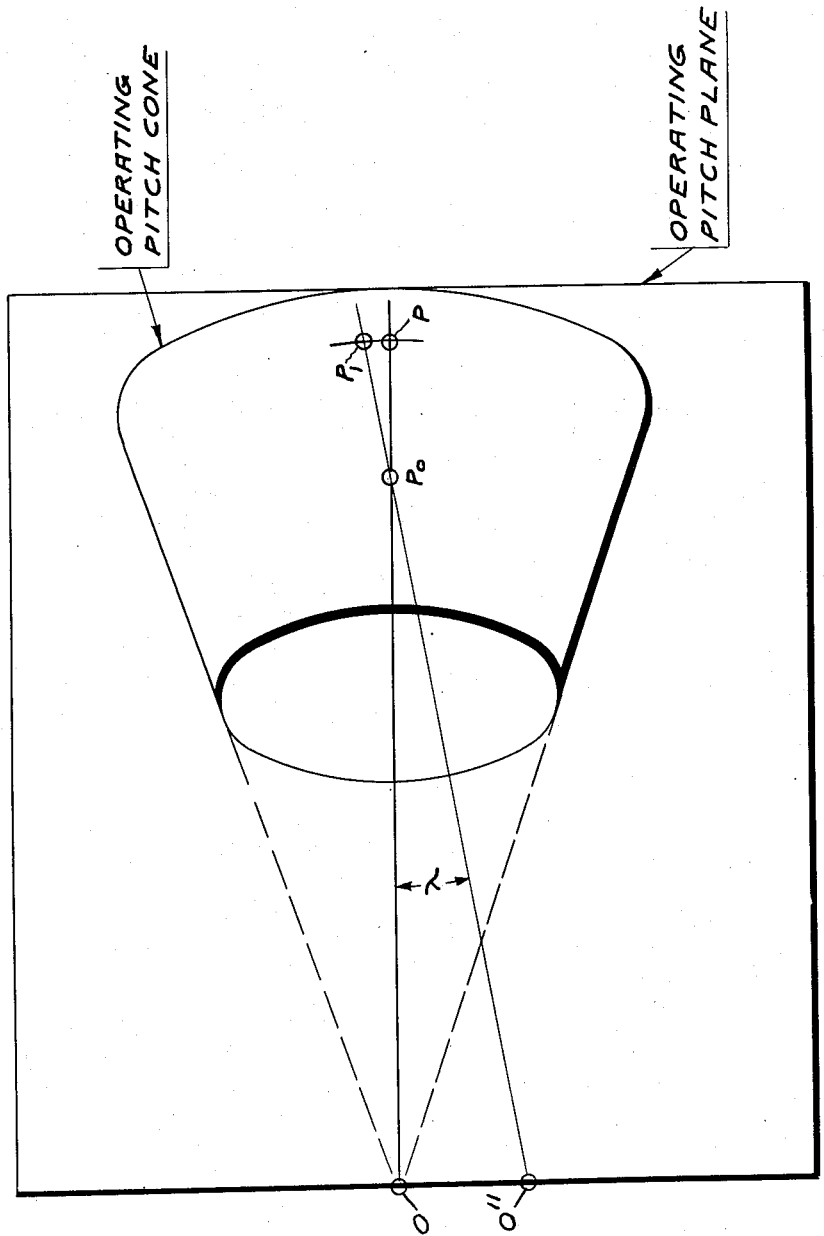
Fig. 41 is a diagrammatical illustration showing the generatrix tangent to the operating pitch cone.

Usually, for conventional generation where the apexes of the cutting and operating pitch cones coincide, the mesh between the tool and the gear blank takes place along a generatrix consisting of the cone distance line, that is, line O—$P_0$ of Fig. 41. As illustrated in Fig. 41, the mesh between the cutting tool and the gear blank, in accordance with the present invention, occurs along the generatrix O″—$P_0$ that lies in the operating pitch plane but inclined to the cone distance line, O—$P_0$, by an angle $\lambda$.

Thus, in accordance with the present invention, the mismatch of the cutter blade angles of Fig. 17, for the gear and for the mating pinion, causes the generating action to occur on the cutting pitch cones of Fig. 18 instead of the conventional manner of generating on the operating pitch cones, this generation on the cutting pitch cones, however, causes an alteration in the timed relationship between generating rolls of the cutting tool and gear blank at the operating pitch plane by the amount of distance P′—P″ of Fig. 40 which in turn displaces the line of mesh between the cutting tool and the gear by the amount of the angle $d\partial$ of Fig. 40 or more specifically by the amount of the angles $d\partial_P$ and $d\partial_G$ of Fig. 22, this displacement of the line of mesh by the amount of the angle $d\partial$ causes the generatrix to swing through the angle $\lambda$ of Fig. 41 in the operating pitch plane and, finally, the movement of the generatrix by the amount of angle $\lambda$, cause the removal of the inherent bias "in" error as shown by the dotted outline of Fig. 27 so as to cause the tooth to assume the non-twisted shape of Fig. 26.

The present invention is applicable to both the gear and the mating pinion and may be employed on generating machines equipped with or without the cutter tilt mechanism.

The method of generating spiral bevel gears, described above, is also applicable to the generation of hypoid gears, which are, generally, a form of spiral bevel gear.

Figure 42:
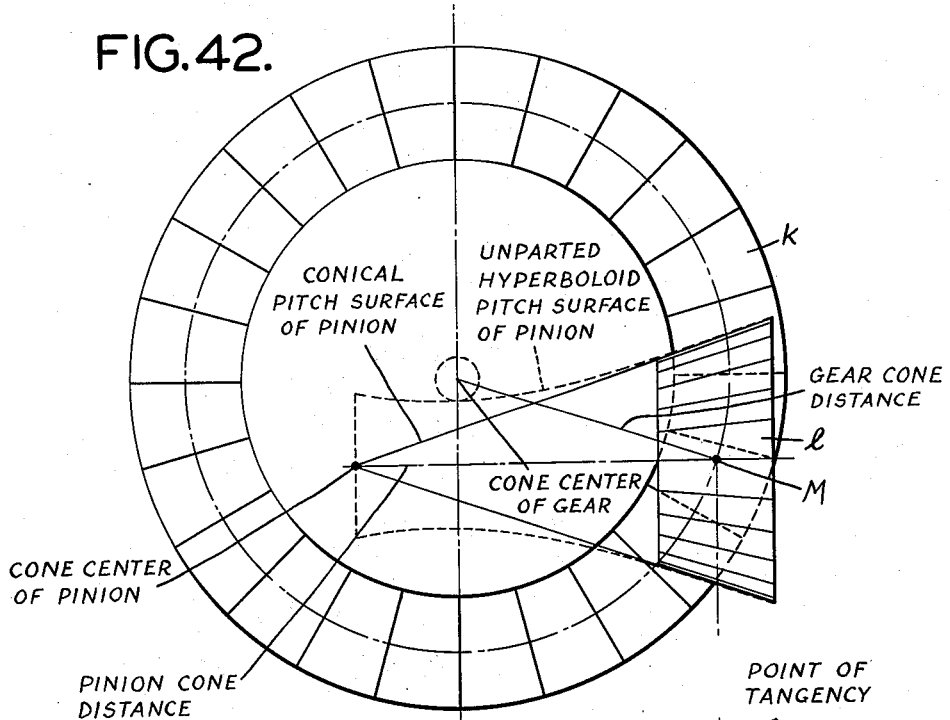
Fig. 42 is a perspective view of the pitch surfaces of the mating pair of hypoid gears.
Figure 43:
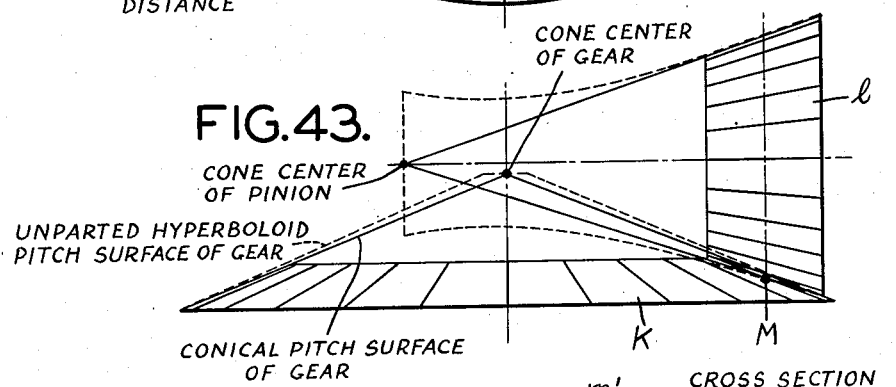
Fig. 43 is a side view of the pitch surfaces shown in Fig. 42.

In Figs. 42 and 43 are illustrated the type of pitch surfaces that occur in hypoid gearing. The actual pitch surface is an unparted hyperboloid. The cone is a special form of the unparted hyperboloid. The gear, or larger member of the mating pair may have either a conical or an unparted hyperboloid for its pitch surface. The pinion, or smaller member of the mating gear pair must, because of its offset, have for its pitch surface the unparted hyperboloid. These pitch surfaces are represented by legends $k$ and $l$. For the sake of simplicity in the calculations the pitch surface for both mating gear members is assumed to be a cone. This cone is made tangent to the respective hyperboloid at the point of mesh M at the center of the gear face.

In conventionally generated hypoid gears the finished cutting of the gear, or larger member, is executed so as to create a gear tooth spiral angle and normal tooth pressure angle that will suit the design requirements, that are necessary for the service performance of the gears. The gear tooth spiral angle and the normal tooth pressure angle are used for the finishing machine set-up of the gear member. The mating pinion, or smaller member, is generated with a spiral angle and a normal tooth pressure angle to suit, and to match with, the characteristics of the mating gear. In the calculating procedure the pinion spiral angle, and the gear and pinion normal tooth pressure angles are determined that will match the mating gear in the gear root plane. Corrections must be made in this pinion spiral angle and this normal tooth pressure angle so as to transfer these values to the corresponding pinion root plane. The pinion root plane spiral angle and normal tooth pressure angle are used for the finishing machine set-up of the pinion.

All of the values upon which the teeth of hypoid gears are calculated and generated are constant throughout the length of the gear tooth with the one exception of the pinion spiral angle. The pinion spiral angle changes from the large end of the pinion to the small end of the pinion, as described in connection with the preceding description of spiral bevel gears. This variation in spiral angle, however, indicates that a tilt angle for the pinion that is suitable for one point along the pinion tooth is not suitable for another point along the same pinion tooth.

The variation in the pinion cutter spiral angle along the referred to pinion tooth is caused by a variation in the gear cutter spiral angle along its tooth. A variation in the gear spiral angle will cause a variation in the corresponding pinion spiral angle.

Due to the impossibility of varying the pinion cutter blade angle, an inaccurate normal pinion tooth pressure angle is generated at every point along the pinion tooth except the one point of calculation. Because this point of calculation M is taken at the center of the face, and because the tilt angle is added to the inside blade angle of the pinion cutter and subtracted from the outside blade angle of the pinion cutter, the resulting inaccuracy that is caused by the inaccurate generation of the pinion normal pressure angle results in a pinion twisted tooth.

The direction of this twist is such that the concave side of the pinion tooth has a pressure angle at the small end that is too small, and a pressure angle at the large end that is too large. The convex side of the pinion tooth has a pressure angle at the small end that is too large, and a pressure angle at the large end that is too small. These errors in pressure angles vary in amount such that the pinion pressure angle will not mate properly with the corresponding gear tooth. The direction of twist described here is a biased "in" twist.

In the conventional method of generating hypoid gears the inherent biased "in" condition due to the varying spiral angle is prevented between the pinion and its mating gear by the position or location of the work piece with respect to the machine center of roll. The cone center of the work piece is pushed beyond the machine center of roll by an amount that is known as the advance of the work. For the convex side of the pinion tooth this advance of the work is made smaller than that for the concave side of the pinion tooth. This difference between the advance of the work for the two sides of the pinion tooth in the generating process introduces a correction factor in the cutting of this pinion, so to overcome the inherent tendency of the teeth of the pinion to have a biased "in" relationship to the teeth of the mating gear. If the mating gear, or larger member of the hypoid pair, has a tooth twisted in the direction of bias "in," the cutting process for the pinion, or smaller member, must be such that this said pinion tooth will be twisted in the direction of bias "out." If two biased "out" teeth are mated together the tooth contact will be inclined to the face of the tooth as shown in Figs. 31 and 32. Should a pinion tooth have a sufficient amount of bias "out" so as to match up with the mating biased "in" tooth pattern the contact will be as shown in Figs. 33 and 34.

It has been found in practice that the method employed in the conventional process of cutting the teeth of hypoid gears is not an expedient means of obtaining correct tooth forms. Hypoid gears that have their biased "in" error corrected by the method described above do not mesh with each other in the proper manner even though the biased "in" error has been corrected. Gears will mesh properly with each other when they are generated from a common basic member. The conventional method of removing bias "in" does not create the same effect as that obtained by a common basic member. The cutting tool of the pinion member is tilted out of position with respect to the cutting tool of the mating gear member. The correction process for eliminating bias "in" has merely changed the size of the corresponding imaginary crown gear for the two sides of the pinion tooth. The pinion imaginary crown gear sizes are also different for the size of the imaginary crown gear for the mating gear member. Thus, the basic member that generates the concave side of the pinion tooth is made smaller in diameter and tilted with respect to the basic member that generates the convex side of the mating gear tooth. Likewise, the basic member that generates the convex side of the pinion tooth is made larger in diameter and tilted with respect to the basic member that generates the concave side of the mating gear tooth. This procedure of correcting a biased "in" condition is simply an attempt to superimpose one error on top of an existing error, with the hope that the superimposed error will correct and nullify the effects of the existing error.

Hypoid gears generated by a means that corrects the biased "in" error by superimposing another error thereon will develop sensitivity.

As in the case of spiral bevel gears, I have discovered that the use of an imaginary common basic member for the generation of mating hypoid gears can be obtained when the time relationship between the cutting tool and the work piece is altered from that of the conventional value. Accepting the premise that it is impossible to bring the cutting action of the pinion cutter into a parallel relationship with the cutting action of the mating gear cutter, it still is possible, however, to transfer the cutting pitch plane to a position that will coincide with the direction of cutting action of the respective cutting tool. Instead of attempting to generate hypoid gears from a calculating point M at the center of the gear face on the operating pitch surface, as is the conventional practice, a more expedient method is obtained by generating these gears from a calculating point at the center of the gear face on a cutting pitch surface, when this said calculating point coincides with the respective root plane.

Figure 44:
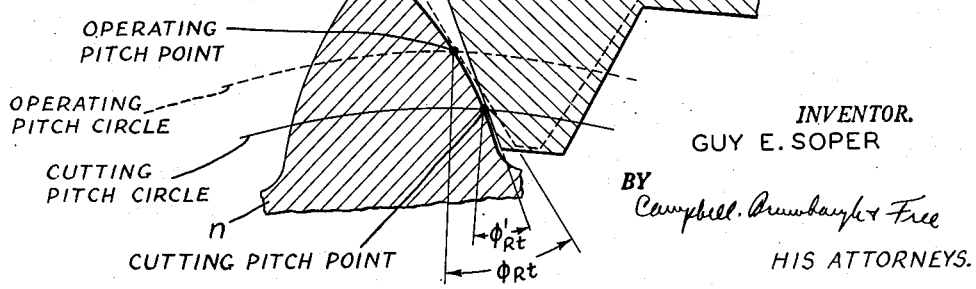
Fig. 44 is a partial view in section of a cutting tool and a hypoid gear to be generated in accordance with the present invention.

If the basic member for the pinion and the mating hypoid gear must be out of parallel with respect to each other because of the fact that the cutting tools generate the root lines lying in root planes that are themselves out of parallel, then the proper generation of these gears is obtained when the generating action places the action of the basic member substantially in the respective root plane of the gear being generated. This situation is illustrated in Fig. 44. Here we have a cutting pitch circle as well as an operating pitch circle. The motion of the cutting tool m, with respect to the generating motion of the gear tooth n, is timed with the cutting pitch circle instead of the operating pitch circle. This timed relationship is determined at the calculating point at the center of the gear face that is known as the cutting pitch point. Conventional generation would time the cutting tool with the gear tooth at the calculating point at the center of the gear face on the operating pitch circle that would be known as the operating pitch point. The difference here is an alteration in the relationship of the generating motion between the work piece and cutting tool so as to transfer the calculating point from a position at the operating pitch point to a position at the cutting pitch point. This requires an alteration in the blade angle of the cutting tool if the required normal tooth pressure angle is to be maintained. Legend $m$ represents a section of the cutting tool in partial view that would be required to generate the gear tooth in accordance with the present invention. Legend $m'$ represents the corresponding cutting tool that would be required to generate the same gear tooth in accordance with the method of cutting used in conventional practice.

Assuming that the blade angle of the blade $m'$ is $\phi_{Rt}$ and the blade angle used in the present invention is $\phi'_{Rt}$, the difference between the operating and cutting transverse pressure angles $$\Delta\phi_{Rt}=\phi_{Rt}-\phi'_{Rt}$$

Fig. 45 shows a hypoid gear tooth represented by legend $n$ having both of its profile sides generated by cutters $m$ and $m''$ in accordance with the present invention. The cutting action here is the same as that shown in Fig. 44, except illustrating the generating process for both sides of the gear tooth.

Fig. 46 shows the preferred departure of the blade angle of a cutting tool that will generate a hypoid tooth in accordance with the present invention, as compared with a conventional cutting tool. It is preferred that both the inside and outside blade angles shall be made smaller than the conventional value, and then the generating action shall be altered in time relationship between the generating motion of the cutting tool and the generating roll of the work piece so as to cause the generation of the required normal tooth pressure angle. This will alter the cutting action from that of conventional practice such that the point of timing between the motion of the cutting tool and the work piece shall be moved into a plane that is somewhat parallel to the plane of the cutting tool.

Fig. 47 shows a cutting pitch plane that departs from the operating pitch plane $o$. The cutting pitch circle of Fig. 44 has been made smaller than the corresponding operating pitch circle because of the alterations of the blade angles of the cutting tool of Fig. 46 so as to transfer the cutting pitch plane of Fig. 47 to a position that approaches the root plane $p$, of the gear being generated. This means that the cutting action taking place in the cutting pitch plane $r$, has been brought more closely parallel to the plane of the cutting tool that must be positioned to the root plane. This departure of the cutting pitch plane $r$, from the operating pitch plane $o$, of moving it more nearly parallel to the corresponding root plane $p$, has the effects of generating the teeth without a biased "in" twist, and this results in the generation of mating hypoid gear teeth with the effects of a common basic member. The basic member, or imaginary crown gear represented by the cutting tool, is positioned in the root plane. Correct generating action is obtained when the cutting pitch plane, representing this generating action, is positioned at, or close by the root plane containing the plane of the basic member, or imaginary crown gear.

Figure 48:
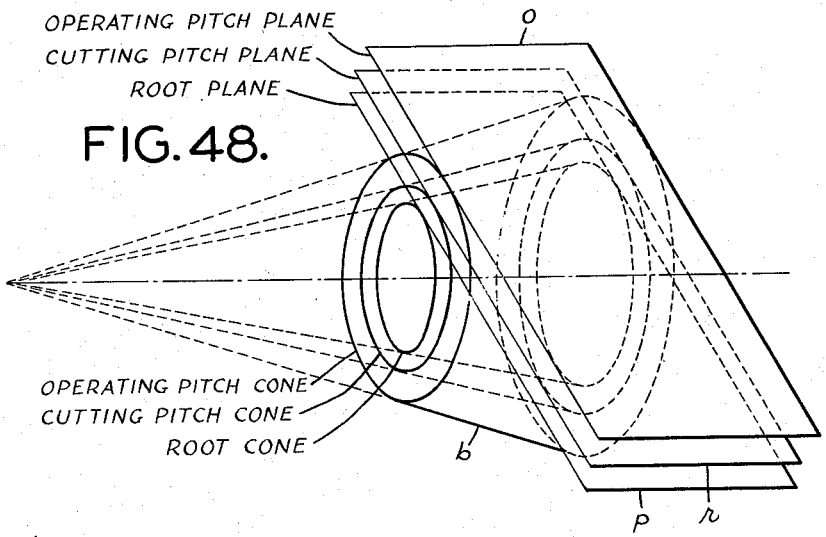
Fig. 48 is similar to Fig. 47 except the root plane and the cutting pitch plane are reversed.

Fig. 48 is the same as Fig. 47 except that the cutting plane $r$, is located on the opposite side of the root plane $p$. Figs. 47 and 48 illustrate the fact that the positioning of the cutting pitch plane $r$, may be close by, either above or below, the respective root plane, and that the correct generation of hypoid gear teeth is obtained when this cutting pitch plane is in the vicinity of the root plane, but not necessarily coinciding with the root plane.

Figure 49:
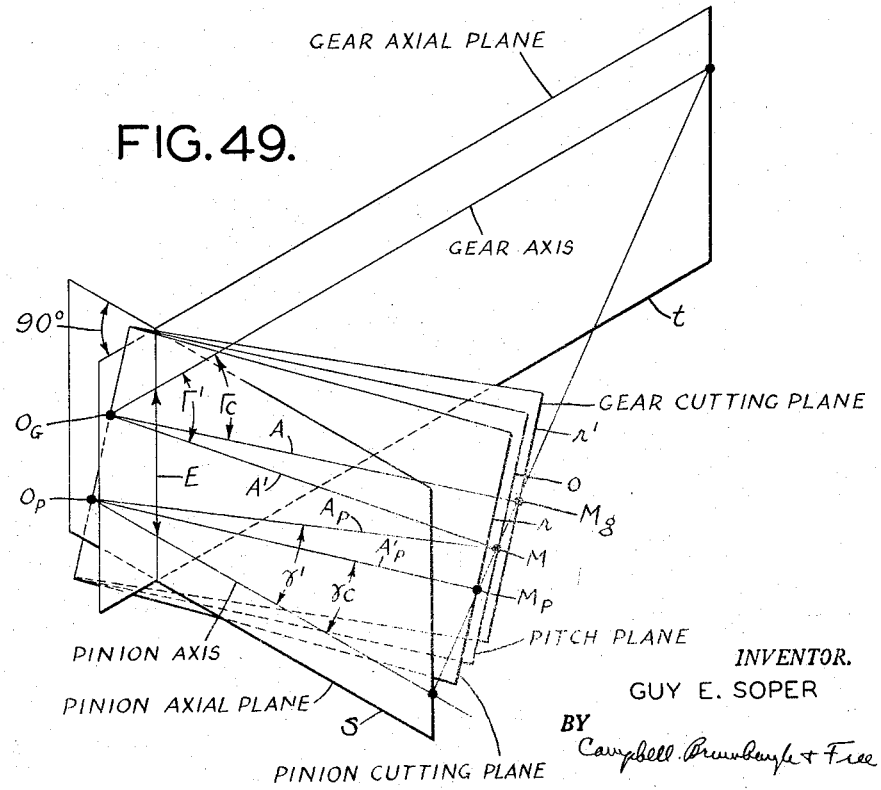
Fig. 49 is an isometric view of the axial planes together with the cutting and operating pitch planes of hypoid gears generated in accordance with the present invention.

Fig. 49 shows what happens when a correct method of generating hypoid gears is employed. Instead of a single pitch plane "$o$," for both the cutting action and the operating action we have now three planes, one for the operating action and two for the cutting action. There has been a cutting pitch plane $r'$ added for the gear, and a cutting pitch plane $r$ added for the pinion member. The departure of angle of relationship between the gear and the pinion cutting pitch planes is introduced to compensate for the angular relationship between the gear and pinion root planes. The time relationship between the cutting tool and work piece in accordance with the present invention has separated the calculating points $M_g$ and $M_p$ so as to cause the generating action to become sustantially parallel to the respective root planes in which the basic members must operate.

In Fig. 49, the points $O_p$ and $O_g$ represent the pinion cone center and the gear cone center, these points being offset from each other in the pinion axial plane S and the gear axial plane T which are shown as being in right angular relation. The gear cone distances from the points M and $M_g$ are indicated as A and A' and the pinion cone distances from the points M and $M_p$ are represented as $A_p$ and $A'_p$.

It has been found in practice that the relative position of points $M_g$ and $M_p$ of Fig. 49 with respect to the position of point M is not important for the generation of correct hypoid tooth forms. The thing of importance is the separation of point $M_g$ from point $M_p$ irrespective of the relationship of these points from point M. In other words, hypoid tooth forms are correctly generated when the cutting pitch plane $r'$ of the gear has an angular relationship to the cutting pitch plane $r$, of the pinion so as to compensate for the angular relationship between the two respective root planes. The correct generation of hypoid gear tooth forms does not depend upon the angular relationship of the cutting pitch plane to the respective operating pitch plane as long as there is a proper angular relationship between the pinion and gear cutting planes. Thus the proper tooth form for hypoid gears is determined by a cutting process that alters the time relationship between the cutting tool and work piece such that the natural tendency towards a biased "in" twist between the pinion and its mating gear is corrected by a separation of the cutting pitch planes of the pinion and mating gear that is of a sufficient amount to overcome this inherent tendency towards a biased "in" twist. The difference between gears generated by means of the present invention and those generated by means of conventional practice is due to the correction of an inherent biased "in" relationship between mating gear teeth by a means of timing, rather than by a means of positioning. Instead of positioning the cutting tool with respect to the work piece, a time relationship is introduced, as illustrated in Figs. 44 and 45, so as to throw the plane of the cutting action of the pinion and the mating gear at an angular relationship, as shown by the cutting planes of Fig. 49.

Figure 50:
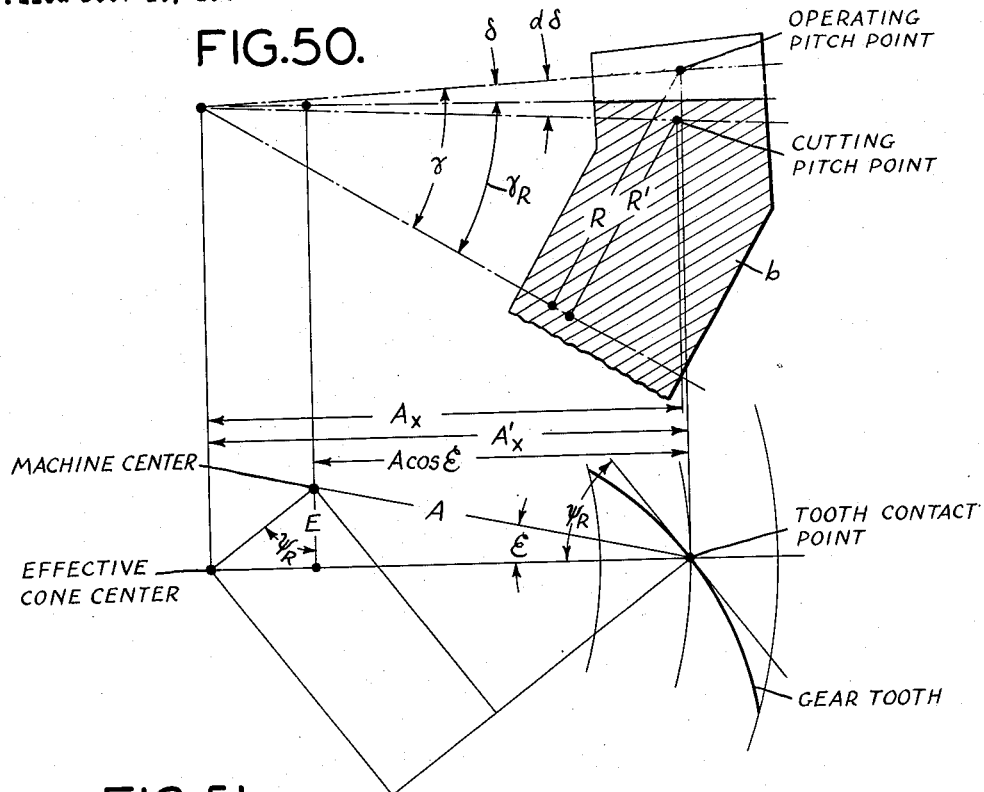
Fig. 50 is a diagrammatic view in section showing the difference between the operating pitch cone angle as compared to the cutting pitch cone angle of a gear generated in accordance with the present invention.
Figure 51:
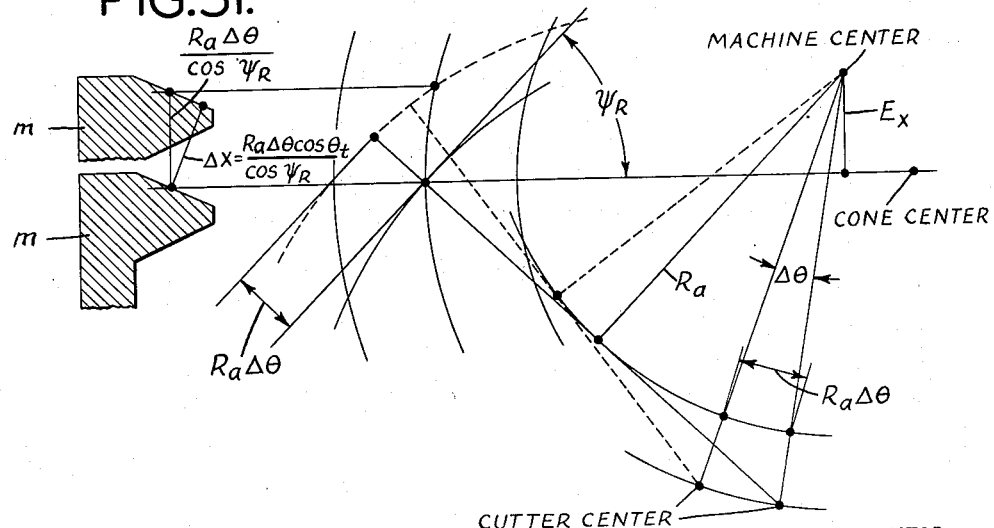
Fig. 51 illustrates diagrammatically the change in spiral angle due to generation of gears in accordance with the present invention.

The magnitude of the departure of the cutting pitch plane towards the root plane and away from the operating pitch plane, as illustrated in Figs. 47 and 48, is illustrated in Fig. 50 and calculated as follows:
assuming that $d\partial$ = operating minus cutting pitch cone
$\partial$ = operating dedendum angle
$\gamma$ = operating pitch angle
$\gamma_R$ = root angle
$\phi_R$ = operating normal pressure angle
$\Delta\phi_R$ = difference between operating and normal pressure angles
$\psi_R$ = root line spiral angle
WR = conventional work roll
CR = cradle roll
E = offset then $$Ax = A \cos \epsilon + E \tan \psi_R$$

$$A'x = \frac{Ax \cos (\partial - d\partial)}{\cos \partial}$$

$$R = \frac{Ax \sin \gamma}{\cos \gamma}$$

$$R' = \frac{Ax \sin (\gamma - d\partial)}{\cos \partial}$$

$$WR = CR\frac{Ax}{R}$$

$$WR' = WR + WR = CR\frac{A'x}{R'}$$

and $$\tan d\partial = \frac{\tan \phi_R \tan \Delta\phi_R}{(\cot \gamma + \tan \partial) \cos^2 \psi_R}$$

as in (4) in the example given in connection with Fig. 17. This departure of the cutting pitch plane away from the operating pitch plane causes an alteration of the spiral angle that is used for positioning the cutting tool in the generating process. This departure is the same as that illustrated in Fig. 20. As the cutting pitch plane reduces the cutting pitch angle with respect to the operating pitch angle, the spiral angle becomes smaller than the operating spiral angle. The magnitude of this change in spiral angle is essentially the same as that illustrated in Fig. 21. The departure of the cutting pitch plane away from the operating pitch plane in the direction of the root plane, causes an alteration in the amount of work roll in the generating process. This alteration in work roll occurs when the cradle roll remains unchanged from that of the conventional value. The magnitude of this work roll alteration is illustrated in Fig. 51, and is calculated as follows:
assuming that $\Delta WR$ = change in work roll from the conventional value
WR = conventional work roll
$\Delta\phi_R$ = change in cutter blade angle from conventional value
$\phi_R$ = conventional cutter blade angle
$\psi_R$ = conventional root line spiral angle then $$\Delta x = \frac{Ra \Delta \theta \cos \phi_t}{\cos \psi_R} = \frac{Ra' \Delta \theta \cos \phi_t'}{\cos \psi_r}$$

$$\phi'_t - \phi_t = \Delta\phi_t$$

$$R'a - Ra = \Delta Ra$$

$$\tan \phi_R = \tan \phi_t \cdot \cos \psi_R$$

$$\tan \Delta\phi_R = \tan \Delta\phi_t \cdot \cos \psi_r$$

$$\Delta Ra \cdot WR = \Delta WR \cdot Ra$$

and $$\Delta WR = WR \frac{\tan \phi_R \tan \Delta\phi_R}{\cos^2 \psi_R}$$

From the foregoing it will be apparent that the present invention provides a method of generating spiral bevel gear teeth and hypoid gear teeth by means of which a desired degree of accuracy may be attained in the cutting of such teeth whereby improved meshing of the teeth of such gears is accomplished.

While the invention has been described with particular reference to the steps heretofore enumerated, it is to be understood that these specific details, together with the sample computations herein provided, are for purposes of illustration only and that the invention is not to be limited save as defined in the appended claims.

I claim:

1. A method of eliminating bias between mating spiral bevel gears and mating hypoid gears comprising rolling an annular cutter and a gear blank while rolling said cutter and gear relatively in timed relation, said timed relation being based on a point in a cutting pitch plane to which said cutter is adjusted, and said cutting pitch plane being positioned by a generating action in a direction that is substantially parallel to the root plane of the said gear.

2. A method of eliminating bias between mating spiral bevel gears and hypoid gears comprising rotating an annular cutter and a gear blank while rolling said cutter and gear relatively in timed relation, said timed relation being based on a point on a cutting pitch cone to which said cutter is adjusted having a different cone angle than the cone angle of the operating pitch cone of the gear to be produced, and which provides a reduced diameter of the cutting pitch circle as compared to the diameter of the equivalent operating pitch circle.

3. A method of eliminating bias in spiral bevel gears and hypoid gears comprising rotating an annular cutter and a gear blank while rolling said cutter and gear relatively in timed relation, said timed relation being based on a point on a cutting pitch cone having a different cone angle than the cone angle of the operating pitch cone, said cutter having a cutter angle for the cutting pitch cone angle such that the diameter of the cutting pitch circle at the center of the gear face is smaller than the diameter of the operating pitch circle for both sides of the gear tooth.

4. A method of eliminating bias in spiral bevel gears and hypoid gears comprising rotating an annular cutter and a gear blank while rolling said cutter and gear blank relatively in timed relation, and at substantially uniform speed, said timed relation being based on a point on a cutting pitch cone to which said cutter is adjusted having a different cone angle than the cone angle of the operating pitch cone of the gear to be produced, the cutting angles of the cutter teeth being such as to reduce the cutting normal pressure angle on both sides of the gear tooth, and the speed of the generating roll of the gear blank being higher than the generating roll of the cutter so that the operating normal pressure angle on both sides of the gear tooth will be larger than the cutting normal pressure angle.

5. A method of eliminating bias in spiral bevel and hypoid gears comprising rotating an annular cutter and a gear blank while rolling said cutter and gear blank relatively in timed relation, said timed relation being based on a point on a cutting pitch cone to which said cutter is adjusted, having a smaller cone angle than the cone angle of the operating pitch cone of the gear to be produced; the blade angle of the cutter being such as to reduce the normal pressure angle on both sides of the gear tooth, and the speed of the generating roll of the gear blank being higher than the generating roll of the cutter, so that the operating normal pressure angle on both sides of the gear blank will be larger than the cutting normal pressure angle.

6. A method of eliminating bias in spiral bevel and hypoid gears comprising rotating an annular cutter and a gear blank while rolling said cutter and gear relatively in timed relation, said timed relation being based on a point on a cutting pitch cone to which the angles of the cutter blades are adjusted having a smaller cone angle than the cone angle of the operating pitch cone of the gear to be produced; the cutting angles of the cutter being such as to reduce the cutting normal pressure angle on both sides of the gear tooth, and the speed of the generating roll of the gear blank being higher than the generating roll of the cutter so that the operating normal pressure angle on both sides of the gear tooth will be larger than the cutting normal pressure angle.

7. A method of eliminating bias in the teeth of spiral bevel gears comprising rotating an annular cutter in cutting relation to a rotating gear blank and rolling said cutter and said blank relatively in timed relation, said timed relation being accomplished by increasing the speed of roll of the blank with respect to said cutter such that the cutting pitch circle at the center of the face cone distance is smaller than the operating pitch circle at the same cone distance, and the cutter blade angles being decreased to correspond to the cutting pitch circle.

8. A method of eliminating bias in the teeth of spiral bevel and hypoid gears comprising rotating an annular cutter in engagement with a rotating gear blank while rolling said gear blank and cutter relatively at uniform speed, and with said cutter adjusted to a cutting pitch cone having a cone angle smaller than the cone angle of the operating pitch cone of the gear to be produced, the apices of said cones being substantially coincident, and timing the roll of said cutter and said gear blank at a point on the cutting pitch cone that is the same distance from the cone center as the point of timing for conventional tooth generation.

9. A method of eliminating bias in the teeth of spiral bevel and hypoid gears comprising rotating a cutter having annularly arranged cutting teeth in cutting relationship to a gear blank and rolling the cutter and said blank relatively to generate said gear, said cutter axis being adjusted to a spiral angle on a cutting pitch cone having a cone angle smaller than the cone angle of the operating pitch cone, the apices of said cones being substantially coincident, and the movement of the cutter in the generating action being timed to said cutting pitch circle.

10. A method of eliminating the bias of mating gear teeth of a pair of spiral bevel gears comprising rotating an annular cutter and a gear blank while rolling them relatively in timed relation with the cutter adjusted so that the cutting dedendum angle on both sides of the gear tooth on one member of the gear pair is smaller than the positive value of the corresponding operating dedendum angle whereby a variation in the spiral angle at different points taken lengthwise along the gear tooth will be reduced in a tendency to cause a bias in said teeth, the apices of said cutting and operating dedendum angles being substantially coincident.

11. A method of generating mating spiral bevel and hypoid gears conjugate to a common basic member, comprising rotating an annular cutter in timed relation with the gear blanks, said timed relation being based on a point in each respective cutting pitch cone to which the said cutter is adjusted, having different cone angles than the cone angles of the operating pitch cones of the gears to be produced, and which provides reduced diameters for the cutting pitch cones as compared to the diameters of the equivalent operating pitch cones.

12. A method of generating the teeth of spiral bevel and hypoid gears so that these teeth will mesh as generated by a common basic member, comprising rotating an annular cutter and the gear blanks while rolling the said cutter and gear blanks in timed relation, said timed relation being based on a point in the cutting pitch planes to which the said cutter is adjusted, and the cutting blade angles of the cutter being adjusted to the cutting pitch planes, and the speed of the generating roll of the gear blanks being higher than the generating roll of the cutter, so that the operating normal pressure angle of both mating gears will be larger than the cutting normal pressure angle.

13. A method of generating the teeth of spiral bevel and hypoid gears so that these teeth will mesh as generated by a common basic member, comprising rotating an annular cutter and the gear blanks while rolling said cutter and gear blanks in timed relation, said timed relation being based on a point in the respective cutting pitch planes to which the said cutter is adjusted, and the cutter blade angle of the cutter for generating the teeth of one mating gear member being such as to reduce the cutting normal pressure angle on both sides of this gear tooth, and the speed of the generating roll of this gear blank being higher than the generating roll of the cutter, so that the operating normal pressure angle of both sides of this gear tooth will be larger than the cutting normal pressure angle.

14. A method of generating the teeth of spiral bevel and hypoid gears conjugate to a common basic member, comprising rotating an annular cutter in timed relation with the gear blanks, and rolling the cutter and said blanks relatively to generate said gears, said cutter axis being adjusted to a spiral angle in the cutting pitch cones of the gears having the sum of the center of face cutting pitch diameters smaller than the sum of the center of face operating pitch diameters.

GUY E. SOPER.

REFERENCES CITED

The following references are of record in the file of this patent:

UNITED STATES PATENTS

| Number | Name | Date |
| --- | --- | --- |
| 2,274,761 | Wildhaber | Mar. 3, 1942 |
| 2,310,484 | Wildhaber | Feb. 9, 1943 |
| 2,342,232 | Wildhaber | Feb. 22, 1944 |